US011520870B2

(12) United States Patent
Xia et al.

(10) Patent No.: US 11,520,870 B2
(45) Date of Patent: Dec. 6, 2022

(54) PROXIMITY-BASED ACCESS

(71) Applicant: MicroStrategy Incorporated, Vienna, VA (US)

(72) Inventors: Feng Xia, Vienna, VA (US); Siamak Ziraknejad, Reston, VA (US); Liang Chen, Fairfax, VA (US); Quan Jia, Oakton, VA (US)

(73) Assignee: MicroStrategy Incorporated, Vienna, VA (US)

( * ) Notice: Subject to any disclaimer, the term of this patent is extended or adjusted under 35 U.S.C. 154(b) by 131 days.

(21) Appl. No.: 16/844,078

(22) Filed: Apr. 9, 2020

(65) Prior Publication Data

US 2020/0233949 A1    Jul. 23, 2020

Related U.S. Application Data

(63) Continuation of application No. 15/954,100, filed on Apr. 16, 2018, now Pat. No. 10,657,242.

(51) Int. Cl.
*G06F 21/35* (2013.01)
*H04L 9/40* (2022.01)
(Continued)

(52) U.S. Cl.
CPC ............ *G06F 21/35* (2013.01); *H04L 9/3226* (2013.01); *H04L 63/083* (2013.01);
(Continued)

(58) Field of Classification Search
CPC ............. G06F 21/35; G06F 2221/2111; H04L 9/3226; H04L 63/083; H04L 63/0853; H04W 12/08

See application file for complete search history.

(56) References Cited

U.S. PATENT DOCUMENTS 5,812,764 A    9/1998  Heinz, Sr.
6,061,790 A    5/2000  Bodnar
(Continued)

FOREIGN PATENT DOCUMENTS

CA    2769086    10/2019
EP    2665326    12/2017
(Continued)

OTHER PUBLICATIONS

"MacID: Unlock your Mac with just your fingerprint," Kane Cheshire, Mar. 2015, [retrieved on Dec. 30, 2015]. Retrieved from the Internet: URL<http://macid.co/>. 4 pages.
(Continued)

*Primary Examiner* — Chau Le
(74) *Attorney, Agent, or Firm* — Fish & Richardson P.C.

(57) ABSTRACT

Methods, systems, and apparatus, including computer programs encoded on a computer storage medium, for proximity-based access. In some implementations, a computing device detects an attempt to access the computing device while the computing device is in a secured state. In response to detecting the attempt to access the computing device, the computing device sends a first message to a server system over a network. After sending the message, the computing device receives a second message from the server system over the network, the second message comprising authentication data for the computing device. The computing device determines that a mobile device that was previously designated as an authentication factor for accessing the computing device is located within a predetermined level of proximity of the computing device, and the computing device grants access to the computing device.

20 Claims, 17 Drawing Sheets

Related U.S. Application Data

(60) Provisional application No. 62/486,390, filed on Apr. 17, 2017, provisional application No. 62/486,347, filed on Apr. 17, 2017.

(51) Int. Cl.
*H04W 12/08* (2021.01)
*H04L 9/32* (2006.01)
*H04W 12/63* (2021.01)

(52) U.S. Cl.
CPC ......... *H04L 63/0853* (2013.01); *H04W 12/08* (2013.01); *H04W 12/63* (2021.01); *G06F 2221/2111* (2013.01)

(56) References Cited

U.S. PATENT DOCUMENTS

| | | |
|---|---|---|
| 6,317,829 B1 | 11/2001 | Van Oorschot |
| 6,694,431 B1 | 2/2004 | Binding |
| 6,720,860 B1 | 4/2004 | Narayanaswami |
| 7,158,777 B2 | 1/2007 | Lee |
| 7,284,127 B2 | 10/2007 | Gehrmann |
| 7,339,908 B2 | 3/2008 | Uhlik |
| 7,378,939 B2 | 5/2008 | Sengupta et al. |
| 7,395,549 B1 | 7/2008 | Perlman |
| 7,400,878 B2 | 7/2008 | Hassan et al. |
| 7,418,596 B1 | 8/2008 | Carroll |
| 7,424,615 B1 | 9/2008 | Jalbert |
| 7,471,634 B1 | 12/2008 | Wenzel |
| 7,599,493 B2 | 10/2009 | Sandhu |
| 7,600,676 B1 | 10/2009 | Rados et al. |
| 7,734,045 B2 | 6/2010 | Sandhu |
| 7,881,288 B2 | 2/2011 | Noldus et al. |
| 7,979,899 B2 | 7/2011 | Guo et al. |
| 8,094,821 B2 | 1/2012 | Hsu |
| 8,286,227 B1 | 10/2012 | Zheng |
| 8,307,406 B1 | 11/2012 | Aboujaoude |
| 8,327,422 B1 | 12/2012 | Friedman |
| 8,364,963 B2 | 1/2013 | Lind et al. |
| 8,371,501 B1 | 2/2013 | Hopkins |
| 8,396,452 B1 | 3/2013 | Matsuoka |
| 8,423,768 B2 | 4/2013 | Huang |
| 8,452,964 B2 | 5/2013 | Hahn |
| 8,467,770 B1 | 6/2013 | Ben Ayed |
| 8,498,618 B2 | 7/2013 | Ben Ayed |
| 8,539,559 B2 | 9/2013 | Nakhjiri |
| 8,595,810 B1 | 11/2013 | Ben Ayed |
| 8,601,602 B1 | 12/2013 | Zheng |
| 8,621,005 B2 | 12/2013 | Boyd et al. |
| 8,625,796 B1 * | 1/2014 | Ben Ayed ........ H04L 63/0861 380/258 |
| 8,711,656 B1 | 4/2014 | Paulson |
| 8,923,191 B2 | 12/2014 | Hanson |
| 8,955,081 B2 | 2/2015 | Metke |
| 9,075,979 B1 | 7/2015 | Queru |
| 9,251,332 B2 | 2/2016 | Giobbi |
| 9,301,139 B2 | 3/2016 | Korgaonkar |
| 9,401,915 B2 | 7/2016 | DeWeese et al. |
| 9,407,624 B1 | 8/2016 | Myers |
| 9,425,962 B2 | 8/2016 | Ramon et al. |
| 9,438,332 B2 | 9/2016 | Tian et al. |
| 9,449,165 B2 | 9/2016 | Potbhare et al. |
| 9,520,918 B2 | 12/2016 | Adrangi |
| 9,741,033 B2 | 8/2017 | Bhatnagar |
| 9,846,977 B1 | 12/2017 | Cox et al. |
| 9,887,980 B1 | 2/2018 | Balnnakhtar |
| 9,906,561 B2 | 2/2018 | Jain et al. |
| 10,064,052 B2 | 8/2018 | Peluso et al. |
| 10,206,099 B1 | 2/2019 | Trinh et al. |
| 10,212,136 B1 * | 2/2019 | Gehret ................ H04W 4/80 |
| 10,231,128 B1 | 3/2019 | Ziraknejad et al. |
| 10,531,316 B1 * | 1/2020 | Ichapurapu ........ H04W 36/03 |
| 10,581,810 B1 | 3/2020 | Gehret et al. |
| 10,657,242 B1 | 5/2020 | Xia et al. |
| 10,771,458 B1 | 9/2020 | Xia et al. |
| 10,855,664 B1 | 12/2020 | Ziraknejad et al. |
| 11,134,385 B2 | 9/2021 | Ziraknejad et al. |
| 11,140,157 B1 | 10/2021 | Xia et al. |
| 11,343,232 B2 | 5/2022 | Gehret et al. |
| 2002/0045424 A1 | 4/2002 | Lee |
| 2002/0180586 A1 | 12/2002 | Kitson et al. |
| 2002/0194500 A1 | 12/2002 | Bajika |
| 2003/0046589 A1 | 3/2003 | Gregg |
| 2003/0063003 A1 | 4/2003 | Bero et al. |
| 2003/0065919 A1 | 4/2003 | Albert |
| 2004/0064728 A1 | 4/2004 | Scheurich |
| 2004/0203595 A1 | 10/2004 | Stnghal |
| 2004/0243856 A1 | 12/2004 | Shatford |
| 2005/0044393 A1 | 2/2005 | Holdsworth |
| 2005/0221798 A1 | 10/2005 | Sengupta et al. |
| 2005/0268107 A1 | 12/2005 | Harris et al. |
| 2005/0269401 A1 | 12/2005 | Sptizer et al. |
| 2006/0083208 A1 | 4/2006 | Lin |
| 2006/0242423 A1 | 10/2006 | Kussmaul |
| 2006/0251044 A1 | 11/2006 | Haddad |
| 2007/0061590 A1 | 3/2007 | Boye et al. |
| 2007/0130472 A1 | 6/2007 | Buer |
| 2007/0150723 A1 | 6/2007 | Estable |
| 2008/0016537 A1 | 1/2008 | Little |
| 2008/0052775 A1 | 2/2008 | Sandhu |
| 2008/0152098 A1 | 6/2008 | Paryzek et al. |
| 2008/0250147 A1 | 10/2008 | Knibbeler et al. |
| 2008/0289030 A1 | 11/2008 | Poplett |
| 2009/0093215 A1 | 4/2009 | Eisenbach |
| 2009/0121890 A1 | 5/2009 | Brown et al. |
| 2009/0313687 A1 | 12/2009 | Popp |
| 2010/0031345 A1 | 2/2010 | Sinclair |
| 2010/0063895 A1 | 3/2010 | Domingues et al. |
| 2010/0120406 A1 | 5/2010 | Banga |
| 2010/0275010 A1 | 10/2010 | Ghirardi |
| 2011/0081860 A1 | 4/2011 | Brown |
| 2011/0169654 A1 | 7/2011 | Ketari |
| 2011/0221590 A1 | 9/2011 | Baker |
| 2011/0314539 A1 | 12/2011 | Horton |
| 2012/0002813 A1 | 1/2012 | Wei |
| 2012/0066749 A1 | 3/2012 | Taugbol et al. |
| 2012/0100806 A1 | 4/2012 | Hall |
| 2012/0272279 A1 | 10/2012 | Lim |
| 2012/0289191 A1 | 11/2012 | Punra |
| 2012/0322384 A1 | 12/2012 | Zerr et al. |
| 2013/0040574 A1 | 2/2013 | Hillyard |
| 2013/0041938 A1 | 2/2013 | Lin |
| 2013/0073671 A1 | 3/2013 | Nagpal et al. |
| 2013/0152175 A1 | 6/2013 | Hronnoko |
| 2013/0157676 A1 | 6/2013 | Baek et al. |
| 2013/0159699 A1 | 6/2013 | Torkkel |
| 2013/0173915 A1 | 7/2013 | Haulund |
| 2013/0174252 A1 | 7/2013 | Weber et al. |
| 2013/0237190 A1 | 9/2013 | Smith |
| 2013/0268687 A1 | 10/2013 | Schrecker |
| 2013/0268758 A1 | 10/2013 | Schrecker |
| 2013/0268766 A1 | 10/2013 | Schrecker |
| 2013/0268767 A1 | 10/2013 | Schrecker |
| 2013/0268881 A1 | 10/2013 | Bartkiewicz |
| 2014/0040991 A1 | 2/2014 | Potonniee |
| 2014/0062874 A1 | 3/2014 | Suggs |
| 2014/0067678 A1 | 3/2014 | Lee |
| 2014/0108810 A1 | 4/2014 | Chenna |
| 2014/0164774 A1 | 6/2014 | Nord |
| 2014/0173695 A1 | 6/2014 | Valdiva |
| 2014/0189808 A1 | 7/2014 | Mahaffey |
| 2014/0269755 A1 | 9/2014 | Veiga |
| 2014/0273845 A1 | 9/2014 | Russell |
| 2014/0282846 A1 | 9/2014 | DeWeese et al. |
| 2014/0282877 A1 | 9/2014 | Mahaffey et al. |
| 2014/0298432 A1 | 10/2014 | Brown |
| 2014/0304505 A1 | 10/2014 | Dawson |
| 2014/0330560 A1 | 11/2014 | Venkatesha et al. |
| 2014/0337956 A1 | 11/2014 | Korgaonkar |
| 2014/0366123 A1 | 12/2014 | DiBona et al. |
| 2015/0074230 A1 | 3/2015 | Lee |
| 2015/0121464 A1 | 4/2015 | Hughes, Jr. |
| 2015/0121488 A1 | 4/2015 | Vaughn |

(56) References Cited

U.S. PATENT DOCUMENTS

| | | | |
|---|---|---|---|
| 2015/0135310 | A1 | 5/2015 | Lee |
| 2015/0178721 | A1 | 6/2015 | Pandijaran |
| 2015/0179008 | A1 | 6/2015 | Sung et al. |
| 2015/0270971 | A1 | 9/2015 | Dietrich |
| 2015/0302856 | A1 | 10/2015 | Kim et al. |
| 2015/0310452 | A1 | 10/2015 | Baitch |
| 2015/0319142 | A1 | 11/2015 | Herberg |
| 2015/0339870 | A1 | 11/2015 | Cojocaru et al. |
| 2015/0350894 | A1 | 12/2015 | Brand |
| 2015/0351038 | A1 | 12/2015 | Dooley et al. |
| 2015/0358315 | A1 | 12/2015 | Cronin |
| 2015/0382304 | A1 | 12/2015 | Park |
| 2016/0050564 | A1 | 2/2016 | Newczas et al. |
| 2016/0183164 | A1 | 6/2016 | Pelkey |
| 2016/0192194 | A1 | 6/2016 | Yang |
| 2016/0239001 | A1* | 8/2016 | Chin ................ F24F 11/30 |
| 2016/0249158 | A1 | 8/2016 | Tredoux et al. |
| 2016/0267732 | A1 | 9/2016 | Agrafioti |
| 2016/0294788 | A1 | 10/2016 | Mahajan et al. |
| 2016/0360341 | A1 | 12/2016 | Srivatsa et al. |
| 2016/0364562 | A1 | 12/2016 | Hayes et al. |
| 2016/0378992 | A1 | 12/2016 | Nguyen |
| 2017/0181047 | A1* | 6/2017 | Cai ................ H04W 36/03 |
| 2017/0201931 | A1 | 7/2017 | Swanzey et al. |
| 2017/0213404 | A1 | 7/2017 | Sivalingam |
| 2017/0215030 | A1 | 7/2017 | Choi et al. |
| 2017/0237565 | A1 | 8/2017 | Rommel |
| 2017/0289118 | A1 | 10/2017 | Khosravi et al. |
| 2017/0311116 | A1 | 10/2017 | Aga et al. |
| 2018/0067712 | A1 | 3/2018 | Behzadi et al. |
| 2019/0058700 | A1 | 2/2019 | Kurian et al. |
| 2019/0096243 | A1 | 3/2019 | Doig et al. |
| 2019/0188368 | A1 | 6/2019 | Hastings |
| 2019/0208421 | A1 | 7/2019 | Ziraknejad et al. |
| 2020/0204526 | A1 | 6/2020 | Gehret et al. |

FOREIGN PATENT DOCUMENTS

| | | |
|---|---|---|
| WO | WO 2009113928 | 9/2009 |
| WO | WO 2010052669 | 5/2010 |
| WO | WO 2016093764 | 6/2016 |

OTHER PUBLICATIONS

"Near Lock—Lock and unlock your Mac with your iPhone," Oct. 2014, [retrieved on Dec. 30, 2015]. Retrieved from the Internet: URL<http://nearlock.me/>. 6 pages.

"Near Lock—Lock and unlock your Mac with your iPhone: FAQ," Dec. 2014, [retrieved on Dec. 30, 2015]. Retrieved from the Internet: URL<http://nearlock.me/faq>. 3 pages.

"The Usher Identity Platform: A description of MicroStrategy's mobile identity solution," Usher by MicroStrategy, Apr. 17, 2014, 15 pages.

"Usher Mobile Identity Platform: Deliver biometric-caliber security across the enterprise," Usher by MicroStrategy, Jan. 11, 2014, 24 pages.

"Usher Mobile Identity Platform: Security Architecture," Usher by MicroStrategy, Jul. 23, 2014, 20 pages.

"Apple Watch Programming Guide," Apple.com, Mar. 9, 2015, 81 pages.

"Apple Watch User Guide, Version 1.0," Apple.com, Apr. 23, 2015, 96 pages.

"Availability of two-factor authentication in iOS 9 and OS X El Capitan," Apple.com, Apr. 5, 2016, URL<https://support.apple.com/en-us/HT205075>, 3 pages.

"Google Nexus Unlock," Google Support, accessed on Apr. 19, 2016, URL<https://support.google.com/nexus/answer/6093922>, 7 pages.

"With a Flick of the Wrist, Security Just Got Even Easier," Duo Security Blog, May 5, 2015, URL<https://duo.com/blog/duo-for-apple-watch>, 10 pages.

Barker, Ian, 'Betanews.com,' "MicroStrategy platform Ushers in password-free security," Apr. 2015, [retrieved on Dec. 30, 2016]. Retrieved from the Internet: URL<https://betanews.com/2015/04/02/microstrategy-platform-ushers-in-password-free-security/>. 1 page.

Bertino et al., "Location-Aware Authentication and Access Control—Concepts and Issues," 2009 International Conference on Advanced Information Networking and Applications, 2009, pp. 10-15.

Buckley, "Here's The Official Apple Watch User Guide," Gizmodo, Apr. 23, 2015, URL<http //gizmodo.com/heres-the-official-apple-watch-user-guide-1699820199>, 2 pages.

Cahill et al., "MicroStrategy Introduces Enterprise Security Platform Usher™, Debuts Usher Software Development Kit," MicroStrategy Inc., Apr. 2015, 2 pages.

Fazackerley, Mark, "Usher Functionality," LinkedIn Corporation, Apr. 2014, retrieved from the Internet: URL<http://www.slideshare.net/markfazackerley3/usher-functionality >. 12 pages.

Fidoalliance.org' [online]. "Mobile Connect & FIDO," GSMA, 2014, retrieved from the Internet: URL<https://fidoalliance.org/wp-content/uploads/David-Poillington-GSMA.pdf>. 11 pages.

Hall, "Apple Watch uses constant skin contact to validate Apple Pay purchases," 9to5Mac, Sep. 10, 2014, URL<http://9to5mac.com/2014/09/10/apple-watch-uses-constant-skin-contact-to-validate-apple-pay-purchases/>, 9 pages.

Hellotether.com' [online]. "Lock and unlock your Mac automatically with your iPhone," Fi a Fo Ltd., Dec. 2015, URL<www.hellotether.com>. 10 pages.

Ho and Liu, "On-demand QoS-based Routing Protocol for Ad Hoc Mobile Wireless Networks," Fifth IEEE Symposium on Computers and Communications, Proceedings ISCC 2000, Jul. 3-6, 2000, 6 pages.

Jansen et al., "Proximity-based Authentication for Mobile Devices," Proceedings of the 2005 International Conference on Security and Management, pp. 398-404, Jun. 20, 2005.

Jaros et al., "A New Approach in a Multifactor Authentication and Location-based Authorization," ICIMP 2011: The Sixth International Conference on Internet Monitoring and Protection, pp. 50-53, Mar. 20, 2011.

Kannbourakis et al., "Using SSL/TLS in Authentication and Key Agreement Procedures of Future Mobile Networks," 4th International Workshop on Mobile and Wireless Communications, Sep. 9-11, 2002, 5 pages.

Kastrenakes, Jacob, "Knock app lets you unlock your Mac by tapping your iPhone," The Verge, Nov. 2013, [retrieved on Dec. 30, 2015]. Retrieved from the Internet: URL<http://www.theverge.com/2013/11/5/5069614/knock-iphone-app-wirelessly-unlocks-your-mac>, 2 pages.

Knocktounlock.com' [online], "Introducing Knock 2.0: Unlock your Mac faster and more securely than ever," Aug. 2013, [retrieved on Dec. 30, 2015], Retrieved from the Internet: URL<http://www.knocktounlock.com>. 3 pages.

Knocktounlock.com' [online]. "Knock FAQ: Faster and safer than typing a password. Just Knock. For iPhone + Mac," Nov. 2013, [retrieved on Dec. 30, 2015]. Retrieved from the Internet: URL<http://www.knocktounlock.com/faq/>. 8 pages.

Knocktounlock.com' [online], "Knock/Help: Search for answers," Mar. 2014, [retrieved on Dec. 30, 2015]. Retrieved from the Internet: URL<http://help.knocktounlock.com/>. 5 pages.

Lee, "Apple Watch Will Use Skin Contact To Authenticate Contactless Payments," Ubergizmo, Sep. 10, 2014, URL<http://www.ubergizmo.com/2014/09/apple-watch-will-use-skin-contact-to-authenticate-contactless-payments/>, 2 pages.

Lee, Justin, "Inside MicroStrategy's biometric mobile identity platform Usher," Biometrics Research Group, Inc., Apr. 2015, [retrieved on Dec. 30, 2016). Retrieved from the Internet: URL<http://www.biometricupdate.com/201504/inside-microstrategys-biometric-mobile-identity-platform-usher>. 1 page.

Macrumors.com' [online]. "'Knock' Aims to Let you Unlock Your Mac With Your Apple Watch," Apr. 2015, [retrieved on Dec. 30, 2015]. Retrieved from the Internet: URL<http://www.macrumors.com/2015/04/22/knock-unlock-mac-with-apple-watch/>. 8 pages.

(56) References Cited

OTHER PUBLICATIONS

MicroStrategy.com' [online]. "Introduction to Usher," MicroStrategy Inc., Jun. 2014, retrieved from the Internet: URL<https://mobileapps.microstrategy.com/usher/MSTREmployeeFAQ/MSTREmployeeFAQ.html>. 10 pages.

MicroStrategy.com' [online]. "Usher Help: Version 2.4.07," MicroStrategy Inc., 2015, retrieved from the Internet: URL<http://www2.microstrategy.com/producthelp/Usher/2.4.07/UsherHelp.pdf>. 197 pages.

MicroStrategy.com' [online]. "Usher Mobile Identity Platform: Deliver biometric-caliber security across the enterprise," MicroStrategy Inc., Jan. 2014, retrieved from the Internet: URL<https://www.microstrategy.com/Strategy/media/downloads/products/usher_overview-presentation.pdf >. 24 pages.

MicroStrategyhelp.atlassian.net' [online]. "Usher Security," Mar. 2016, [retrieved on Dec. 30, 2016]. Retrieved from the Internet: URL<https://microstrategyhelp.atlassian.net/wiki/display/README103/Usher+Security>. 10 pages.

Miners, "5 things the Apple Watch can do, and 5 things it can't," PCWorld, Sep. 10, 2014, URL<http://www.pcworld.com/article/2605140/5-things-the-apple-watch-can-and-cant-do.html>, 6 pages.

Mobileconnect.io' [online]. "Secure digital identity is now in your hands: Mobile Connect is a new service that lets you login to websites and apps on any device without having to remember usernames or passwords. You are safely identified through your mobile phone number," Mobile Connect, Mar. 2015, URL<https://mobileconnect.io/>. 12 pages.

Nam et al. Security Enhancement to a Password-Authenticated Group Key Exchange Protocol for Mobile Ad-Hoc Networks. IEEE Communications Letters, vol. 12. Issue: 2., dated Feb. 2008, 3 pages.

Qi-Na et al. "The implementation of FPGA-based RSA public-key algorithm and its application in mobile-phone SMS encryption system," 2011 First International Conference on Instrumentation, Measurement, Computer, Communication and Control, year 2011, 4 pages.

Tsai et al. "High-efficient Multi-Key Exchange Protocol based on Three-party Authentication," 2014 Eighth International Conference on Innovative Mobile and Internet Services in Ubiquitous Computing, year 2014, 6 pages.

United States Office Action in U.S. Appl. No. 14/793,186, dated Nov. 22, 2017, 21 pages.

United States Office Action in U.S. Appl. No. 14/793,186, dated Sep. 26, 2018, 19 pages.

United States Office Action in U.S. Appl. No. 15/427,684, dated Mar. 13, 2018, 32 pages.

United States Office Action in U.S. Appl. No. 15/427,684, dated Nov. 17, 2017, 31 pages.

Usher.com' [online]. "Usher Mobile Identity Platform: Security Architecture," MicroStrategy Inc., 2014, retrieved from the Internet: URL<https://www.microstrategy.com/Strategy/media/downloads/white-papers/Usher-v2-1ArchitectureWhitepaper.pdf >, 20 pages.

Wikipedia.com' [online]. "Bluetooth," Jan. 2004, [retrieved on Mar. 10, 2017]. Retrieved from the Internet: URL<https://en.wikipedia.org/wiki/Bluetooth>. 25 pages.

Wikipedia.com' [online]. "Pretty Good Privacy," Jan. 2004, [retrieved on Mar. 11, 2017]. Retrieved from the Internet: URL<https://en.wikipedia.org/wiki/Pretty_Good_Privacy>. 12 pages.

Wikipedia.com' [online]. "Public key infrastructure," Jan. 2004, [retrieved on Dec. 20, 2016]. Retrieved from the Internet: URL<https://en.wikipedia.org/wiki/Public_key_infrastructure.>. 7 pages.

Wikipedia.com' [online]. "Public-key cryptography," Jan. 2004, [retrieved on Mar. 13, 2017]. Retrieved from the Internet: URL<https://en.wikipedia.org/wiki/Public-key_cryptography>. 16 pages.

Wikipedia.com' [online], "Security Assertion Markup Language," Nov. 2016, retrieved from the Internet: URL<https://en.wikipedia.org/wiki/Security_Assertion_Markup_Language>. 5 pages.

Wikipedia.com' [online]. "Security token," Apr. 2005, [retrieved on Feb. 18, 2017]. Retrieved from the Internet: URL<https://en.wikipedia.org/wiki/Security_token>. 8 pages.

Mare "Seamless Authentication for Ubiquitous Devices," Thesis, May 2016, pp. 1-223.

U.S. Notice of Allowance in U.S. Appl. No. 15/954,033, dated Jul. 20, 2021 19 pages.

Shad et al., "Wi-Auth: WiFi based Second Factor User Authentication", Proceedings of the 14th EAI International Conference on Mobile and Ubiquitous Systems: Computing, Networking and Services, Nov. 2017, 393-402.

auto.howstuffworks.com [online], "How Remote Entry Works" available on or before Apr. 25, 2014, via Internet Archive: Wayback Machine URL https://web.archive.org/web/20140425072358/http://auto.howstuffworks.com/remote-entry.htm/printable, retrieved on May 11, 2021, URL<http://auto.howstuffworks.com/remote-entry.htm/printable>, 4 pages.

blueproximity.sourceforge.net [online], "BlueProximity" available on or before Nov. 9, 2007, via Internet Archive: Wayback Machine URL https://web.archive.org/web/20210430095355/http://blueproximity.sourceforge.net/, retrieved on May 4, 2021, URL<http://blueproximity.sourceforge.net/>, 1 page.

editorial.autos.msn.com [online], "Driving Without Car Kevs" available on or before May 9, 2012, via Internet Archive: Wayback Machine URL https://web.archive.org/web/20120509234238/http:/editorial.autos.msn.com/article.aspx?cp-documentid=435298, retrieved on May 11, 2021, URL<http://editorial.autos.msn.com/article.aspx?cp-documentid=435298>, 5 pages.

en.wikipedia.org [online], "Remote keyless system" available on or before May 11, 2014, via Internet Archive: Wayback Machine URL https://web.archive.org/web/20140511143810/https:/en.wikipedia.org/wiki/Remote_keyless_system, retrieved on May 11, 2021, URL<https://en.wikipedia.org/wiki/Remote_keyless_system>, 4 pages.

nytimes.com [online], "How It Works; Remote Keyless Entry: Staying a Step Ahead of Car Thieves," Jun. 7, 2001, retrieved on May 11, 2021, retrieved from URL <https://www.nytimes.com/2001/06/07/technology/how-it-works-remote-keyless-entry-staying-a-step-ahead-of-car-thieves.html>, 3 pages.

sourceforge.net [online] "blueproximity v1.2.5" Feb. 2008, retrieved on May 11, 2021, retrieved from URL <https://sourceforge.net/p/blueproximity/code/HEAD/tree/branches/trunk/README >, 1 page.

sourceforge.net [online]"BlueProximity manual", Feb. 2008, retrieved on May 11, 2021, retrieved from URL <https://sourceforge.net/p/blueproximity/code/HEAD/tree/branches/trunk/docs/manual.odt?format=raw >, 8 pages.

sourceforge.net [online],"BlueProximity" available on or before Apr. 26, 2013, retrieved on May 4, 2021, retrieved from URL <2021https://sourceforge.net/projects/blueproximity/>, 3 pages.

U.S. Notice of Allowance in U.S. Appl. No. 16/298,759 dated Mar. 24, 2021, 12 pages.

Brutch et al., "Mutual Authentication, Confidentiality, and Key MANagement (MACKMAN) System for Mobile Computing and Wireless Communication," Proceedings 14th Annual Computer Security Applications Conference (Cat. No. 98EX217), 1998, 10 pages.

Hsu et al., "Password authenticated key exchange protocol for multi-server mobile networks based on Chebyshev chaotic map," 2013 IEEE International Conference on Pervasive Computing and Communications Workshops (PERCOM Workshops), 2013, 90-95.

Notice of Allowance in U.S. Appl. No. 16/806,024, dated Apr. 14, 2022, 10 pages.

Office Action in U.S. Appl. No. 16/806,024, dated Dec. 24, 2021, 7 pages.

Yamamoto et al., "Improvement of Encryption Processing Speed for a User Attestation System Using a Cellular Phone," 14th International Conference on Network-Based Information Systems, 2011, 602-606.

\* cited by examiner

PROXIMITY-BASED ACCESS

CROSS-REFERENCE TO RELATED APPLICATIONS

This application is a continuation of U.S. application Ser. No. 15/954,100, filed Apr. 16, 2018, now allowed, which claims the benefit of priority to U.S. Provisional Patent Application No. 62/486,390, filed Apr. 17, 2017, titled "PROXIMITY-BASED ACCESS," and U.S. Provisional Patent Application No. 62/486,347, filed Apr. 17, 2017, titled "PROXIMITY-BASED ACCESS," and the entire contents of all prior applications are incorporated by reference herein.

This application incorporates by reference the entire contents of U.S. patent application Ser. No. 15/427,684, filed Feb. 8, 2017, and titled "Proximity-Based Device Access," and U.S. patent application Ser. No. 15/427,607, filed Feb. 8, 2017, and titled "Proximity-Based Logical Access."

BACKGROUND

Many devices, websites, and other resources require authentication of a user before access is granted. For example, computers or phones may require a user to enter a password or code to obtain access.

SUMMARY

In some implementations, a resource, such as a computer or other device, can be configured to grant access to a user based on the proximity of a trusted device. A user can designate a device, such as the user's phone, to serve as a security token that is indicative of an authorized user's presence. The resource can be configured to detect the presence of the trusted device and automatically grant access to the user in response, without requiring user input to the resource or the trusted device. The proximity of a trusted device to another device can also be used to grant automatic and seamless access to a logical resource, such as a virtual private network (VPN), a web application, a web site, a single-sign-on (SSO) interface, and so on, without requiring user input to the resource or the trusted device. Thus, a user may be logged in or otherwise authenticated and given access to a resource based on proximity of the trusted device, without the user having to enter a password, provide biometric input, or provide any other input.

Proximity between two devices can be detected based on direct, wireless communication between the devices. For example, the devices can communicate over a short-range wireless communication protocol, such as Bluetooth. A device may determine that another device is within a predetermined level of proximity of communications from the other device are received with a signal strength above a predetermined minimum threshold.

The process of detecting proximity of two devices using a direct wireless communication channel can be accelerated with communications over a different, second communication channel. To reduce latency in establishing communication over the direct wireless channel, one of the devices may trigger a communication to the other device over a second communication channel, such as a cellular network or the Internet. This second communication channel may involve indirect communication between the devices, e.g., involving one or more servers, routers, networks, etc. between the devices. Communication over the second communication channel can prompt the receiving device to change the manner in which it communicates over the direct wireless communication channel, to reduce delay and increase reliability. For example, in response to communication over the second communication channel, the receiving device can increase the frequency of sending transmissions over the direct wireless communication channel.

A communication over the second communication channel can also enable the mobile device to provide authentication data, such as a password, over this second communication channel rather than the direct wireless communication channel. In many cases, a mobile device each have a network connection through WI-FI or cellular service on a persistent or ongoing basis. As the mobile device approaches a secured resource, there may be some latency in establishing a connection over a direct wireless communication channel, such as Bluetooth. The existing network connection allows the mobile device to provide authentication data, such as a password, to a server, which can forward the authentication data to the resource. Because the network connections of the mobile device and the resource were already present, the latency for the transferring the authentication data is low. This allows the transmission of the authentication data, and receipt and processing of it by the resource, to take place before a direct wireless connection is established. The resource can then provide access as soon as the resource detects the mobile device nearby.

As an example, a computer or other electronic device may be configured to provide automatic access based on proximity of a particular user's mobile phone or other mobile device. The computer and the mobile phone may be configured to communicate over Bluetooth to detect proximity. When the user attempts to access the computer, the computer sends a message to a server system over a network, e.g., such as the Internet, to indicate that access has been attempted. The server, in turn, causes a second message to be sent to the mobile phone, e.g., as a notification over a cellular network. When the mobile phone receives this second message, the mobile phone initiates or increases the frequency of wireless transmissions identifying the mobile device. This allows the computer nearby to detect the mobile device more quickly than it would have with the more infrequent transmissions in the standard operating mode of the mobile device. The mobile device also sends authentication data, e.g., a password for the computer, to the server, which passes the data to the computer. The computer processes the password and can allow access as soon as the computer verifies the proximity of the mobile phone. In this arrangement, the mobile phone is not required to detect proximity of the computer for proximity-based access to occur. Rather, the mobile phone only transmits over the direct wireless communication channel.

Mobile devices are often battery powered and power constrained. Operating the radio of a mobile device to transmit or receive signals can consume significant amounts of power. As a result, many mobile devices operate radios in a low-power mode, e.g., on a reduced duty cycle, in standard operation when no ongoing connections or transfers are established. In many instances, the operating system of a mobile device limits the use of a radio. For example, the operating system may limit the conditions in which an application running in the background (e.g., not currently in view) can perform scanning beyond the standard low-power mode.

The standard, low-power modes of operating a radio are helpful to limit power consumption and increase battery life, but can also introduce delays in the detection of nearby devices. For example, to limit power consumption, a mobile device may use a default operating mode in which the mobile device transmits wireless communications relatively infrequently over a wireless personal area network (WPAN), such as Bluetooth. Due to the relatively long interval between transmissions, a secured resource that relies on these transmissions may experience delays detecting the mobile device. For proximity-based access, the delay in detecting a nearby resource can cause significant latency in providing a user access to the resource.

The delays due to typical device discovery can be reduced or avoided using communications over a second communication channel, as discussed herein. At appropriate times, a server or other system can send a notification to a mobile device that triggers enhanced transmission of messages for announcing the presence of the mobile device for nearby devices. For example, when authentication is needed to access a secure resource, a notification can be sent to a mobile device to switch from a standard or low-power transmission mode to a mode where transmissions occur at a higher rate. The notification can be a silent push notification that does not cause a discernible output to a user, but prompts the operating system of the mobile device to activate an application or other functionality of the mobile device. For example, the notification may trigger the operating system of the mobile device to temporarily grant elevated status to an application running in the background. With the temporary elevated status, the application may be permitted to initiate an enhanced transmission mode, for example, with the same or similar ability as an application operating in the foreground. In this manner, the mobile device can transmit wireless messages at an increased frequency, at the specific time that the secured resource needs the signals to carry out authentication, based on communication over the second communication channel. This technique can provide improved responsiveness for device discovery and authentication, while retaining the power-saving benefits of standard low-power beacon advertisement modes when authentication is not needed.

Reliability is also enhanced through the transmission of authentication data from the mobile device to the secured resource through a server, e.g., over an Internet connection rather than a direct wireless connection. Because an Internet connection or other network connection may have a lower latency and higher bandwidth than a direct wireless connection between the mobile device and resource, the mobile device can send a password or other authentication data to the secure device over this channel. The resource can receive and process the authentication data before or concurrently with detection of proximity.

In one general aspect, a method includes: detecting, by the computing device, an attempt to access the computing device while the computing device is in a secured state; in response to detecting the attempt to access the computing device, sending, by the computing device, a first message to a server system over a network; after sending the first message, receiving, by the computing device, a second message from the server system over the network, the second message comprising authentication data transmitted to the server system by a mobile device that was previously designated as an authentication factor for accessing the computing device, wherein the authentication data is transmitted by the mobile device after the computing device sent the first message to the server system, and wherein the authentication data demonstrates authorization to access the computing device; determining, by the computing device, that the mobile device that was previously designated as an authentication factor for accessing the computing device is located within a predetermined level of proximity of the computing device; and in response to determining that the computing device is located within the predetermined level of proximity of the computing device, and based on the received authentication data, granting, by the computing device, access to the computing device.

Implementations may include one or more of the following features. For example, in some implementations, the method includes determining, by the computing device, a password from the authentication data in the second message; and granting access to the computing device includes providing the password to an operating system of the computing device.

In some implementations, the computing device receives the second message before determining that the computing device is located within the predetermined level of proximity of the computing device; and the method further includes delaying granting access to the computing device until after determining that the computing device is located within the predetermined level of proximity of the computing device.

In some implementations, determining, by the computing device, that the mobile device that was previously designated as an authentication factor for accessing the computing device is located within a predetermined level of proximity of the computing device includes: determining that the mobile device that is located within the predetermined level of proximity is the same mobile device that transmitted, to the server system, the authentication data that the server system sent to the computing device.

In some implementations, the method includes determining, by the computing device, that detection of the presence of the mobile device within a predetermined level of proximity of the computing device occurs within a predetermined time period of the transmission of the first message or the receipt of the authentication data. Access to the computing device is granted based on the determination that detection of the presence of the mobile device within a predetermined level of proximity of the computing device occurs within a predetermined time period of the transmission of the first message or the receipt of the authentication data.

In some implementations, determining that the mobile device that was previously designated as an authentication factor for accessing the computing device is located within a predetermined level of proximity of the computing device includes: receiving, by the computing device, a third message from the mobile device over a direct, wireless radio-frequency communication channel; determining, by the computing device, that a signal strength with which the third message was received satisfies a signal strength threshold; and determining, by the computing device, that the third message includes a device identifier for the mobile device that matches a device identifier for a mobile device previously registered with the computing device as an authentication token for accessing the computing device.

In some implementations, receiving data indicating an attempt to access the computing device while the computing device is in a secured state includes receiving data indicating that the computing device has been powered on, woken from a low-power state, or received user input from a locked state.

In some implementations, granting access to the computing device includes unlocking the computing device.

In some implementations, receiving, by the computing device, a second message from the server system over the network includes receiving encrypted data in the second message, wherein the encrypted data was generated by the mobile device and includes an encrypted form of a password. The method further includes decrypting the password; and granting access to the computing device includes providing the password to software executing on the computing device to enable access to the computing device.

In some implementations, decrypting the password and providing the password are performed by an agent executing on the computing device along with an operating system of the computing device, the agent having permission to provide passwords to the operating system of the computing device; and providing the password to software executing on the computing device to enable access to the computing device includes passing, by the agent executing on the computing device, the password to the operating system of the computing device.

In some implementations, determining that the mobile device that was previously designated as an authentication factor for accessing the computing device is located within a predetermined level of proximity of the computing device includes receiving a communication from the mobile device over a direct wireless communication link.

In some implementations, the direct wireless communication link is a Bluetooth communication link.

In some implementations, determining that the mobile device that was previously designated as an authentication factor for accessing the computing device is located within a predetermined level of proximity of the computing device includes determining that the mobile device has previously been paired with the computing device over the Bluetooth communication link.

In some implementations, determining that the mobile device that was previously designated as an authentication factor for accessing the computing device is located within a predetermined level of proximity of the computing device includes: communicating by the computing device with the mobile device using a link key established during pairing of the mobile device with the computing device using hardware-level Bluetooth pairing managed by an operating system of the computing device.

In some implementations, granting access to the computing device includes unlocking a user interface of the computing device, initiating a new user session on the computing device, resuming an existing user session on the computing device, authenticating a user to the computing device, or logging a user into a user account.

In some implementations, the mobile device is a mobile phone.

In some implementations, granting access to the computing device includes providing a user access to a user interface of the computing device that was unavailable prior to authentication of the user, the access being provided without user input being entered to the computing device or the mobile device between detecting the attempt to access the computing device and providing access to the user interface.

In some implementations, the method includes: in response to receiving the message from the mobile device, determining a signal strength of a wireless connection between the computing device and the mobile device; and determining that the signal strength satisfies a threshold level, wherein the threshold level corresponds to sufficient proximity to allow access to the computing device based on proximity of the mobile device. Granting access to the computing system is based at least in part on determining that the signal strength satisfies the threshold level.

In some implementations, the method includes: in response to receiving a wireless message from the mobile device, identifying, based on the wireless message, the mobile device or a user associated with the mobile device; and accessing data indicating a signal strength threshold designated for the mobile device or a user associated with the mobile device, wherein the signal strength threshold indicates a signal strength that represents a user-selected level of proximity for providing access to the computing device. Determining that the signal strength satisfies the threshold level includes determining that the signal strength satisfies the signal strength threshold.

In some implementations, the authentication data includes an encrypted password that was encrypted using a public key of the computing device; and the method includes decrypting the encrypted password using a private key of the computing device that is stored at the computing device.

In some implementations, the method includes: after granting access to the computing device, determining a signal strength of a wireless connection between the computing device and the mobile device; determining that the signal strength satisfies a threshold level, wherein the threshold level corresponds to distance to automatically restrict access to the computing device; and restricting access to the computing device in response to determining that the signal strength satisfies the threshold level.

In some implementations, the method includes: identifying the mobile device or a user associated with the mobile device; and accessing data indicating a signal strength threshold designated for the mobile device or a user associated with the mobile device, wherein the signal strength threshold indicates a signal strength that represents a user-selected distance level for automatically restricting access to the computing device. Restricting access to the first computing device includes restricting access to the computing device based on determining that the signal strength satisfies the signal strength threshold.

In some implementations, the method includes: in response to determining that the mobile device has been previously associated with the computing device, identifying a user credential corresponding to the association of the mobile device with the computing device, the user credential being issued to a particular user associated with the mobile device; and determining that the user credential corresponding to the association is valid. Granting access to the computing device is performed in response to determining that the user credential corresponding to the association is valid.

In some implementations, a first credential authorizes the user to access the mobile device, and a second credential authorizes the user to access the computing system; and the identified user credential is a third credential that is distinct from the first credential and the second credential, wherein the third credential does not provide access to the mobile device or the computing device.

In another general aspect, a method includes: receiving, by the one or more computers, a first message indicating an attempt to access a secured resource; in response to receiving the first message, identifying, by the one or more computers, a mobile device configured to provide authentication information for accessing the secured resource; causing, by the one or more computers, a second message to be sent to the mobile device; receiving, by the one or more computers, a third message from the mobile device sent by the mobile device in response to receiving the second message, the third message comprising authentication data for authorizing the access to the secured resource; and providing, by the one or more computers, the authentication data to the secured resource.

In some implementations, the first message and the second message each include data that identifies the secured resource.

In some implementations, the first message is sent by the secured resource.

In some implementations, the authentication data includes an encrypted password, and wherein providing the authentication data comprises providing the encrypted password to the secured resource.

In some implementations, causing the second message to be sent to the mobile device comprises causing a silent push notification to be sent to the mobile device.

In some implementations, causing the second message to be sent to the mobile device comprises causing a second message to be sent over a first communication channel, the message causing the mobile device to change one or more parameters for transmission of messages by the electronic device over a second communication channel.

In some implementations, the first communication channel comprises the Internet, and wherein the second communication channel comprises a short-range radiofrequency wireless communication channel.

In some implementations, the second message includes data instructing the mobile device to transmit messages identifying the mobile device over the second communication channel.

In some implementations, identifying the mobile device comprises identifying the mobile device based on a device identifier, a user identifier, or a credential identifier included in the first message.

In some implementations, identifying the mobile device comprises identifying the mobile device based on records indicating that the mobile device has been designated as an authentication factor for authenticating a particular user for accessing the secured resource.

In some implementations, the mobile device is a mobile phone, and the secured resource is a computer.

In another general aspect, a method includes: receiving, by the electronic device, a message over a network over a first communication channel; in response to receiving the message, and without receiving user input to the electronic device after receiving the message: determining, by the electronic device, that the received message corresponds to a particular secured resource; changing, by the electronic device, one or more parameters for transmission of messages by the electronic device over a second communication channel, the messages identifying the electronic device; and providing, by the electronic device, authentication data for accessing the particular secured resource, the authentication data being stored at the electronic device prior to receiving the message.

In some implementations, receiving the message comprises receiving a notification over a cellular network.

In some implementations, receiving the message comprises receiving the message over the Internet.

In some implementations, the particular secured resource is a physical device, and wherein the message includes an identifier for the physical device; the authentication data stored at the electronic device prior to receiving the message comprises a password for the physical device; and determining that the message corresponds to a particular secured resource comprises determining that an identifier in the message matches an identifier corresponding to the physical device.

In some implementations, providing the authentication data comprises providing the authentication data to a server over the Internet, without providing the authentication data directly to the physical device.

In some implementations, the second communication channel comprises a direct short-range radio-frequency communication channel, and wherein providing the authentication data comprises providing the authentication data over a communication channel that is different from the second communication channel.

In some implementations, the second communication channel comprises a direct short-range radio-frequency communication channel, and providing the authentication data comprises the authentication data to a server over the first communication channel.

In some implementations, changing the one or more parameters for transmission of messages by the electronic device over the second communication channel comprises increasing a frequency that the electronic device transmits messages identifying the electronic device over the second communication channel.

In some implementations, changing the one or more parameters for transmission of messages by the electronic device over the second communication channel comprises changing an operating mode of the electronic device from a first operating mode in which the electronic device does not transmit messages identifying the electronic device over the second communication channel to a second operating mode in which the electronic device periodically transmits messages identifying the electronic device over the second communication channel.

In some implementations, providing, by the electronic device, authentication data for accessing the particular secured resource is performed without determining that the particular secured resource is in proximity to the electronic device.

Other embodiments of these aspects include corresponding systems, apparatus, and computer programs, configured to perform the actions of the methods, encoded on computer-readable storage devices. A system of one or more devices can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Advantageous implementations can include one or more of the following features. A user can automatically unlock or otherwise obtain access to a resource by simply bringing a trusted device in proximity of the resource. Access to physical devices and logical resources can be provided automatically based on the proximity of devices. A second communication channel can be used to notify a device when the detection of proximity is needed to support authentication. To conserve power, devices can operate a radio in a low-power mode, e.g., with the radio operated only periodically or even deactivated, while selectively activating the radio when needed to detect proximity and support authentication.

In addition, in some implementations, proximity-based access can be linked to a specific user and a specific credential. As a result, validity of the credential and satisfying policies for use of the credential may be applied to access decisions for proximity based unlocking. Similarly, logging and reporting functions defined for the credential can be triggered when proximity-based access occurs or is attempted. Users can set up associations between resources and devices so that proximity triggers automatic access without action by a system administrator. Nevertheless, because credentials are linked to the associations, the administrator retains the ability to define and update security policies for the credentials, which are then applied to the user-configured proximity-based access, without the administrator configuring individual resources and interactions. For example, in some implementations, applying a condition for using a credential can automatically cause that condition to be applied for access to all resources whose access has been tied to the credential, without needing to change the configuration of the resources individually.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
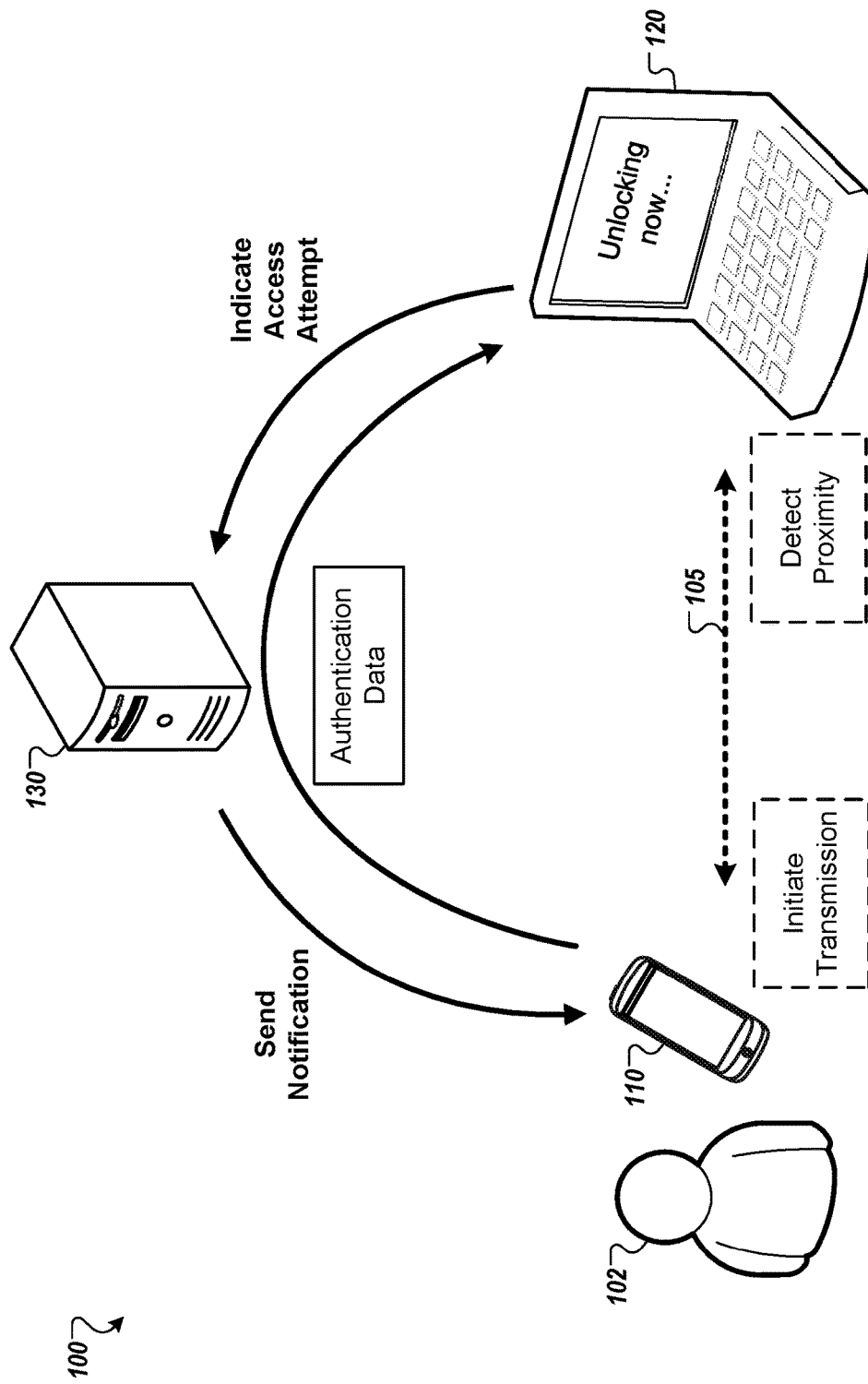
FIGS. 1 and 2A-2B are diagrams that illustrate an example of a system for proximity-based access.

FIG. 1 is a diagram that illustrates an example of a system 100 for proximity-based access. The system 100 includes a resource 120, such as a personal computer or other device, and a trusted device 110, such as the mobile phone of a user 102. The system 100 also includes one or more server systems, represented by server 130, to communicate with the resource 120 and the trusted device 110. In the example, the user 102 has previously associated or registered the trusted device 110 as a security token for the user 102, to be used for gaining access to the resource 120. When the user 102 later brings the trusted device 110 into physical proximity of the resource 120, the resource 120 and the trusted device 110 detect each other and communicate to provide the user 102 access to the resource 120 and/or logical resources (e.g., web pages, files, virtual private networks (VPNs), etc.) accessed using the resource 120.

To facilitate proximity-based access, the system 100 notifies the trusted device 110 when authentication is needed, allowing the trusted device 110 to increase the frequency of transmissions advertising the presence of the device 110. For example, a notification to the device 110 can initiate or trigger a transmission mode that increases a likelihood the resource 120 will detect the presence of the device 110, or decreases the delay before the resource detects the presence of the device 110. This allows a notification from the server 130 to kick-start transmission so the overall delay in detecting proximity is reduced. In addition, the device 110 sends authentication data in response to the notification, before proximity of the devices 110, 120 is detected. This allows the authentication data to be provided to the resource 120 even before any wireless communication occurs between the devices 110, 120 on a direct wireless communication channel. The resource 120 can then verify proximity based on the signal strength of transmissions of the device 110, and the resource can grant access without the device 110 needing to verify proximity.

For example, the user 102 may initiate access to the resource 120, and the resource sends data indicating the access attempt to the server 130. The server 130 identifies the trusted device 110 as a device that may provide proximity-based access if located in proximity to the resource 120. The server 130 then causes a notification to be sent to the trusted device 110, e.g., as a silent push notification or as a message over the Internet. The trusted device 110, upon receiving the notification, increases the frequency of transmissions of wireless messages announcing the presence of the trusted device 110. For example, an operating system of the trusted device 110 can determine that the received notification corresponds to a specific application on the trusted device 110, and in response can enable the application to increase the frequency of transmissions using Bluetooth or another wireless protocol.

In addition, the notification from the server 130 prompts the device 110 to send authentication data for gaining access to the resource 120, e.g., a password for the resource 120, to the server 130. The server 130 forwards this authentication data to the resource 120. Having received the authentication data, the resource 120 can process the data and determine whether it authorizes access. Even if the authentication data would authorize access, e.g., includes a correct password, the resource 120 delays providing access until the proximity of the device 110 is detected. Once proximity of the device 110 is detected, the resource grants access, for example, by passing a received password to an operating system of the resource 120. This arrangement can significantly speed up the process of obtaining proximity-based access, because the notification from the server 130 triggers an increased rate of transmissions from the device 110, and because the transmission and processing of authentication data are not required to occur after establishing a direct wireless connection between the devices 110, 120.

Access to the resource 120 may be provided automatically through the interactions of the devices in the system 100. For example, the communications between the devices in the system 100 can occur without the need for input from the user 102. The user 102 can generally keep the device 110, e.g., a phone, in a pocket or purse without needing to take device 110 out when access to the resource 120 is needed. The user 102 simply initiates access to the resource 120, e.g., by turning on a computer, opening a laptop, waking a device from a sleep mode, etc., and authentication is triggered automatically.

In some implementations, as part of determining whether to provide access, the resource 120 may identify a credential associated that has been designated for the association between the trusted device 110 and the resource 120. The resource 120 may evaluate various factors relating to the identified credential to determine whether automatic access should be granted. For example, the resource 120 may determine whether the user 102 still holds the credential, whether any policies for use of the credential are applicable, and whether policies of the credential would disallow automatic access based on proximity of the trusted device 110.

For simplicity in illustration and description, the resource 120 is shown and described as a computer with respect to FIGS. 1-6. However, the resource 120 that is accessed is not limited to a computer. Any appropriate electronic device may be configured to perform the operations of the resource 120 and provide proximity-based access, including desktop computers, laptop computers, tablet computers, wearable computers, appliances (e.g., dishwasher, clothes washing machine, oven, etc.) vehicles, machinery, power tools, entertainment devices (e.g., television, projector, stereo system, video game system, etc.), electronic locks, electronic doors, home automation systems, security systems, and so on. Similarly, the device 110 is not limited to a mobile phone, and may be any appropriate electronic device, such as a tablet computer, a watch, a necklace, a bracelet, a wearable device, and so on.

In further detail, in the example of FIG. 1, the trusted device 110 and the resource 120 communicate using a short-range wireless communication channel 105, such as a direct wireless radiofrequency (RF) communication link between the devices 110, 120. Examples include wireless personal area networks, communications according to IEEE 802.15, and Bluetooth, e.g., communication using IEEE 802.15.1 protocols or other Bluetooth standards. Other types of wireless links, such as IEEE 802.11 or WI-FI communication, may additionally or alternatively be used. In general, a direct communication link between the devices 110, 120 is used and signal strength over the wireless communication link is used as an indicator of distance between the devices 110, 120. Other techniques for determining distance between devices, including GPS location tracking and WI-FI triangulation, can additionally or alternatively be used to determine proximity of one device to another. In some implementations, the devices 110, 120 may communicate over multiple wireless communication links, concurrently or at different times, and the techniques discussed herein may be performed using any or all of the links.

In the example, the device 110 and the resource 120 have previously been associated, e.g., paired or bonded using Bluetooth, and the device 110 has been designated to represent an authentication factor, representing authorized user 102, for obtaining access to the resource 120. In some implementations, simply pairing the devices 110, 120 is not sufficient to establish the device 110 as an authentication token for automatic access to the resource 120. For example, the user may be required to affirmatively indicate that the device 110 serves as an authentication factor. As another example, an access control agent program executing on the resource 120 may be involved in a pairing process specifically for establishing the device 110 as an authentication factor for the resource 120.

As a result of the pairing, the device 110 and the resource 120 may store identifiers that allows the devices to identify each other. Similarly, the device 110 and the resource 120 may store encryption keys or shared secret information (e.g., a unique link key corresponding to the pairing of the device 110 with the resource 120) allowing the devices to communicate securely or prove their identity to each other.

The device 110 can periodically send signals, such as beacon messages, over the link (e.g., each second, every 5 seconds, every 15 seconds, or at another interval). The signals can include information that identifies the device 110, for example, a MAC address or other device identifier. The resource 120 may also send periodic signals to identify itself. As the device 110 comes near to the resource 120, the devices 110, 120 can identify each other from the periodic signals and establish secure communication using the data stored from pairing. For example, the device's 110 ability to communicate with the resource 120 using the link established previously, during Bluetooth pairing, can demonstrate that the device 110 is the device that the user previously designated as an authentication token.

The resource 120 can evaluate several factors to determine whether to grant access to the user 102 in response to detecting the previously paired device 110. For example, the resource 120 detects the paired device 110, and based on stored records of which pairing links or devices represent authentication tokens, the resource 120 determines that the device 110 represents a valid authentication token. The resource 120 can also determine whether the device 110 is located sufficiently close to the resource 120 to trigger automatic access. In general, the device 110 may be considered to be in proximity to the resource 120 when a distance or measure indicative of distance satisfies a predetermined threshold. For example, the resource 120 may determine that sufficient proximity has been achieved when transmissions from the device 110 have at least a minimum received signal strength at the resource 120. The minimum signal strength can be set as a default of the system, or may be based on hardware capabilities of the devices 110, 120 (e.g., known information about the device model numbers, antennas or radio modules used, transmission powers and reception gain, and so on), and/or data indicating current configurations or settings of the devices 110, 120. Measurements of actual signal strengths detected at different distances can be set through a calibration process, so the signal strength that appears at a particular distance can be measured. As another example, proximity can be determined to be achieved when other indicators of distance indicate that the distance satisfies a threshold. For example, GPS data or WI-FI triangulation data for one or both devices 110, 120 can be used to verify that the distance between the devices 110, 120 is less than or equal to a maximum distance threshold.

This thresholds that are used to determine whether proximity has been achieved may be set by the system provider or an administrator. For example, a default distance may be set by the system or by a security policy, e.g., 3 ft, 5 ft, 10 ft, and so on, or a signal strength corresponding to those distances. In some implementations, the distance or signal strength threshold can be set by a user to customize the unlocking process. In some implementations, the thresholds used, and thus the requirements for achieving proximity to automatically obtain access to the resource 120, may vary based on time, location, the detected presence of other users or devices, and other factors. For example, a credential may have associated conditions that set a first level of authentication requirements during business hours, and set a second level of stricter authentication requirements after business hours. The system may require a greater signal strength or closer distance between devices under the second level of authentication requirement than the first level. As another example, if the authorized user's device 110 is the closest device that the resource 120 detects, or if no other devices are detected nearby, a first threshold may be used. If one or more other devices corresponding to other users are detected by the resource 120, the resource 120 may require a smaller distance between the devices 110, 120 before automatically granting access, especially if a device for another user is determined to be closer to the resource 120 than the device 110 or if the device for the other user is determined to correspond to a user identity that lacks appropriate credentials for obtaining access or has a role or relationship that is not trusted (e.g., a guest, an vendor from a different organization, an unknown user identity, etc.).

The factors used to determine whether access is appropriate can also relate to a credential of the user 102. The association (e.g., pairing) of the device 110 with the resource 120 can be linked to a specific credential that has been issued to the user 102 by a credential authority. The credential may include have associated rules, policies, or conditions, which may be required to be satisfied for the proximity of the device 110 to be used as an authentication factor. These conditions can set requirements or restrictions on use of the credential. In some implementations, these conditions can be separate from, and be imposed in addition to, requirements that the credential be non-revoked and non-expired in order to be used. The resource 120 may retrieve, from stored data at the resource 120, data that identifies the credential associated with the device 110 and its paired link with the resource 120. The resource 120 may also determine, from stored data or from data requested from a server system, the conditions on use of the credential. Since the requirements for use of the credential may change, the resource 120 may verify them with a remote server for a credential authority each time that proximity-based access is initiated. The resource 120 may similarly verify that the credential has not been revoked and is not expired.

Having evaluated the various factors, the resource 120 may determine that access is appropriate, and may automatically unlock itself to allow access by the user 102. For example, an existing session may be resumed, or the user may be logged in to the resource 120. This process can allow the user to obtain access to the resource 120 by bringing a paired device 110 near, without having to manually enter any information to the resource 120 or the paired device 110.

The association between the trusted device 110 and the resource 120 can be linked to a particular user identity and a particular credential that has been issued to the user. This link to a specific user's credential provides an enhanced context for making access decisions. It provides the context of a specific user identity, as well as allows the device-to-device proximity-based interaction to be linked to a broader enterprise-level security plan. The resource 120, the device 110, and/or the server 130 can apply security policies, usage restrictions, reporting functions, and logging functions associated with the credential in addition to determining whether appropriate proximity is detected. These policies can include conditions that specify different behavior of the proximity-based access function based on various contextual factors, such as time, location, usage history, user identity, identity of other devices nearby, and so on.

As a result, the proximity-based access may allow fine-grained control of proximity-based access, as well as administration by a credential-granting authority. For example, the automatic access can be tied to a credential that is separate and independent from a login and password or user account that the resource typically uses for authentication. For example, a user may have a user name and password to log into the operating system of a computer. The proximity-based access may be tied to a distinct, second credential, such as the user's employee credential or other credential that indicates an identity, role, or relationship of the user in an organization. This identity-based credential can be used to limit when proximity-based automatic access is provided. For example, if the device 110 has been associated with the resource 120 and the device 110 is later brought in proximity the resource 120, automatic access may be denied if the user's credential linked to the association has changed or been revoked. As another example, a user's credential may indicate that full access is provided at certain times or locations, but that use of the credential at other times or locations requires additional authentication. As a result, the resource 120 may provide automatic access when the device is brought into proximity at the designated times and locations corresponding to the credential, but may require further verification of identity, such as a PIN or a fingerprint scan, according to the policy of the associated credential, before providing access when proximity is detected at other times or locations.

As policies associated with a credential are updated, the behavior of the resource 120 and device 110 can be updated accordingly. For example, the resource 120 and/or the device 110 can determine current, applicable policies for a credential when access is attempted, e.g., from data from a credential management server, so that access decisions are made according to current, contextually accurate information.

Accordingly, in some implementations, rather than automatically granting access each time that proximity of a trusted device 110 is detected, the resource 120 and/or the server 130 may first determine whether the user possesses a particular credential, and whether conditions associated with the use of the credential are satisfied. As noted above, the access may occur under the context of a specific credential or badge that is managed by an administrator. Policies set for the credential generally may be applied when proximity-based access is attempted. The policies can be maintained and updated at a server system, and these changes may flow through to the local device interactions. As a result, administrators can more easily track and enforce security across an enterprise environment. The access can thus be tied to specific credentials, which may be maintained, modified, or revoked independent of the resource that the user's device can unlock.

The policies associated with a credential can include conditions that restrict when, where, and how access is granted. For example, credential policies or conditions may limit credential use generally, or proximity-based unlocking specifically, to: a time that the user possesses the credential (e.g., is an employee or maintains a particular position or security access permission within the organization); a time or time range (e.g., between 8 am to 5 pm Monday through Friday); or a location or proximity to other users or devices (e.g., within proximity of another employee, or in a particular building, floor, or room).

Further, because proximity-based access attempts are tied to a credential, policies for reporting, logging, or other tracking can be applied. Thus, the device 110 or the resource 120 or both can provide data about successful and unsuccessful access attempts, as defined by policies for the credential.

The factors that the resource 120 considers for determining whether to grant access may additionally or alternatively be evaluated by the device 110 and/or the server 130. For example, if the device 110 determines that the conditions of a credential linked to the pairing with the resource 120 are not satisfied, the device 110 may decline to confirm proximity, or decline to provide a stored password required to for access to the resource 120. Similarly, if the server 130 determines that one or more factors required for authentication are not met, such that the presence of the device 110 would not advance authentication, the server 130 may decline to notify the device 110 and thus not trigger the enhanced discovery mode.

Figure 2A:
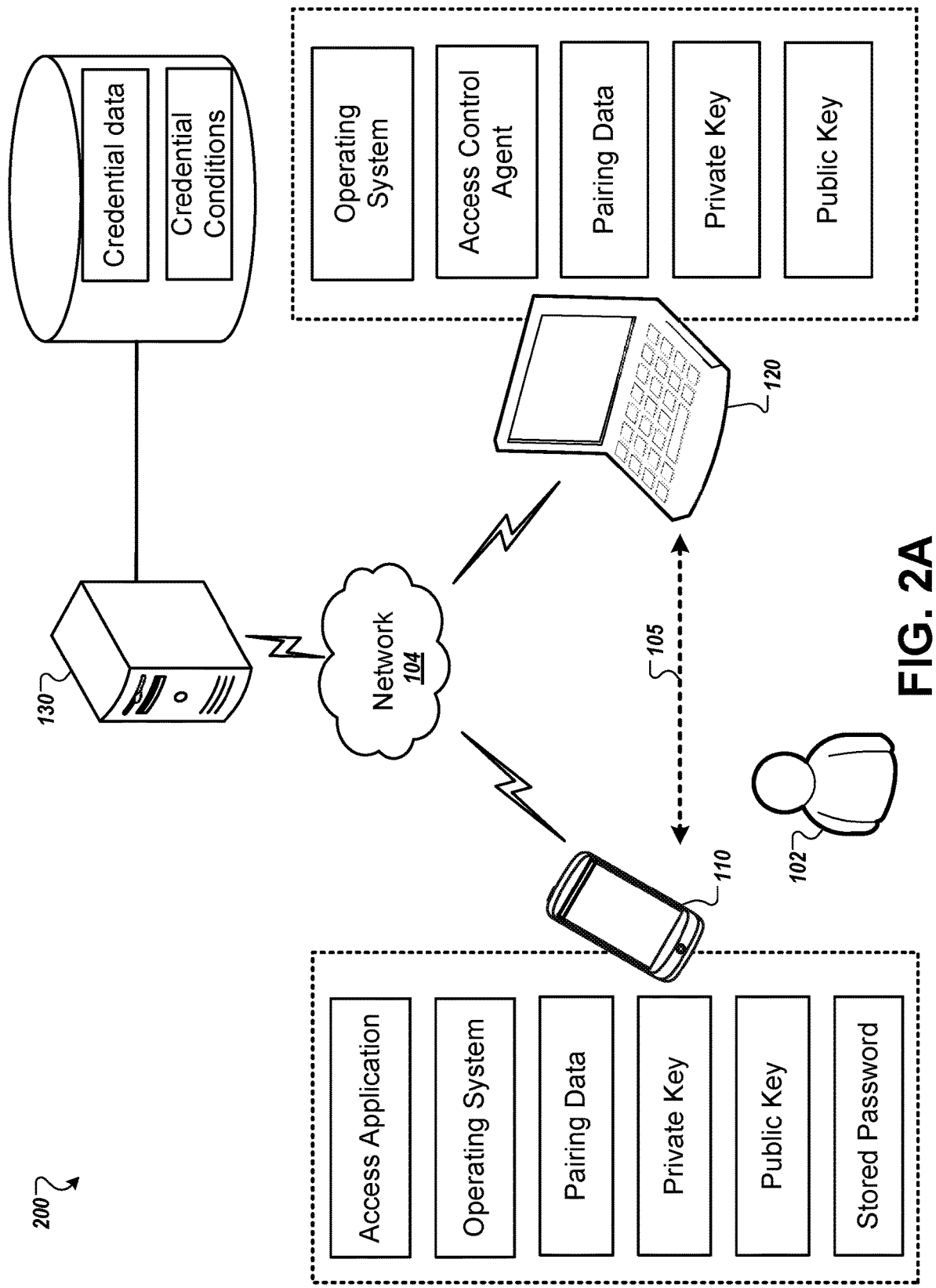

FIG. 2A is a block diagram showing an example of a system 200 for proximity-based access. As illustrated, the device 110 and the resource 120 may communicate with the server 130 over a network 104, which may include public and/or private networks and may include the Internet. The network 104 may represent various different networks or combinations of networks. The device 110 and the resource 120 can also detect each other and communicate directly over a short-range wireless communication channel 105, as described above.

The server 130 has access to credential data indicating the status of credentials and credential conditions indicating limitations and policies associated with credentials. The server 130 can provide the devices 110, 120 information about the limitations on using a particular user's credential, and can provide data indicating whether a particular credential is still valid. The server 130 may represent one or more computers, which may be in the same location or distributed across multiple locations.

The resource 120 has an operating system and access control agent software that execute on the resource 120. The operating system may delegate the ability to enter a password to the access control agent. For example, when appropriate, the access control agent can provide a password for the resource, e.g., through an API or other interface, and request that the resource provide access in response. The resource 120 can also store other data including encryption keys and pairing data. The pairing data can indicate previously paired devices, the credentials used to pair them or register them with the access control agent, and specific encryption keys to use with each paired device.

The mobile device 110 has an operating system and also runs an access application. For example, the access application can manage or provide access to credentials of the user 102 of the mobile device 110. As a result of setting up the device as an authentication factor for accessing the resource 120, the mobile device can store, for example, pairing data, encryption keys, and a stored password that provides access to the resource 120. The pairing data can include, beyond typical pairing indicating a connection between devices, an indication of the credential associated with the pairing with each specific device that the mobile device 110 is paired with. The stored password may be stored in an encrypted form on the mobile device for safekeeping.

In some implementations, the encryption keys stored and designated for the pairing of the devices 110, 120 for authentication purposes are separate from Bluetooth link keys, operating system encryption keys, or other encryption keys used for the communication interface. They may allow additional encryption of communications beyond link-level encryption to establish a secure association. While Bluetooth provides an operating system-level or device level link, these additional encryption keys, used by the access control agent and access application, respectively, provide an additional level of encryption. In some instances these additional keys are used to encrypt certain portions of messages, such as a password transferred from the device 110 to the resource 120, rather than entire messages.

Figure 2B:
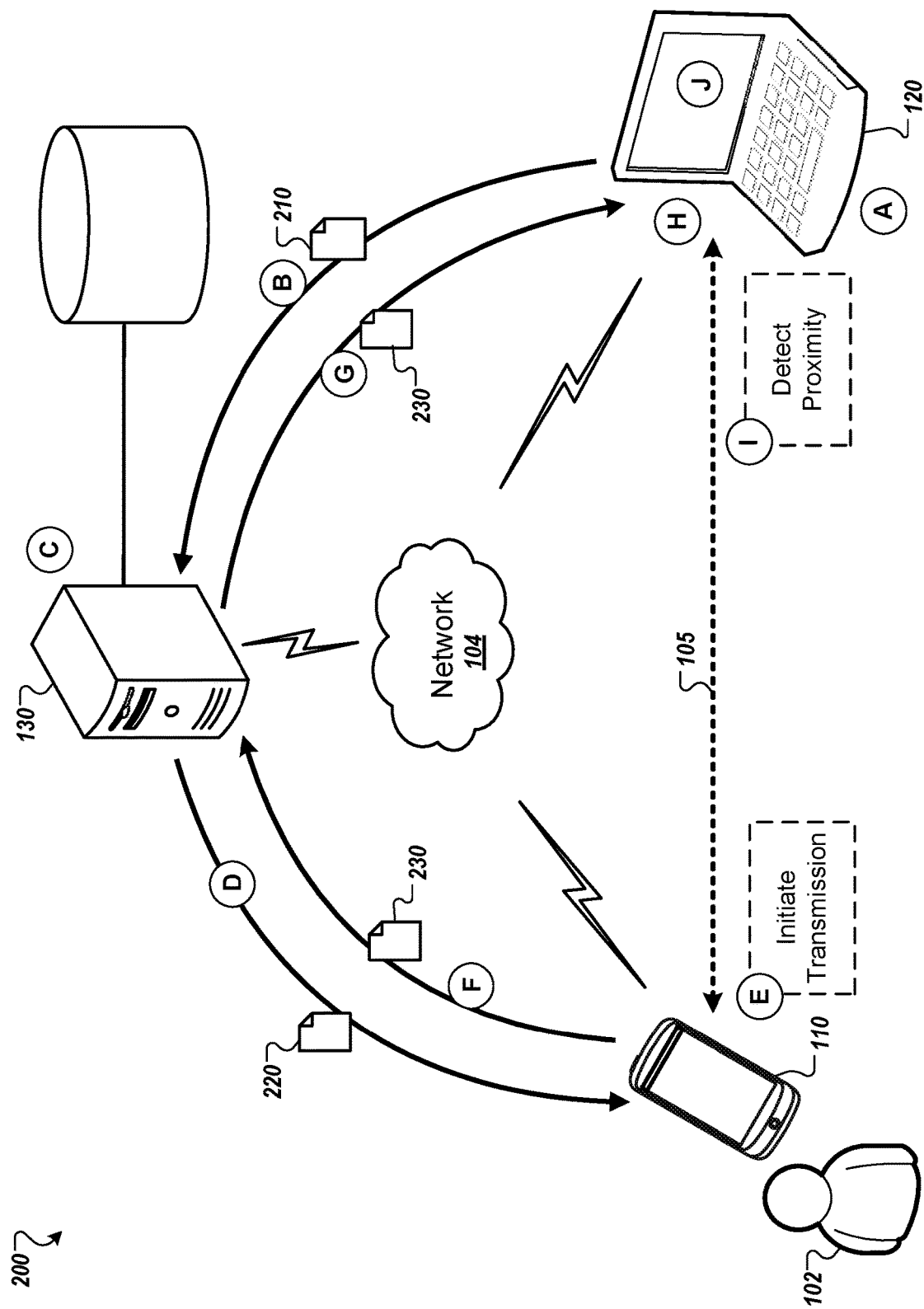

FIG. 2B shows additional detail regarding an example of interactions between the elements in the system 200 to perform proximity-based access. FIG. 2B illustrates a series of stages (A) to (J) that represent various operations of the system 200 and a flow of data. The operations illustrated may be performed in the order indicated or in another order.

In stage (A), the resource 120 detects an attempt to access the resource 120. For example, the resource 120 may initially be in a secured state that requires authentication to change to an unlocked or accessible state. The resource 120 may initially be powered off, in a locked mode, or a low-power sleep mode that requires authentication when woken. The resource 120 may then detect a user input or a change in operating mode. If the resource 120 is a laptop computer, the user 102 may power on the laptop, open the lid of the laptop, press a key of the keyboard or touch the touchpad, or otherwise attempt to gain access to the laptop.

In stage (B), in response to the attempt to access the resource 120, the resource 120 sends a message 210 to the server 130 over the network 104. When the access attempt is detected, the access control agent on the resource 120 initiates further processing to expedite attempt automatic authentication based on proximity, as discussed below. The message 210 indicates that an attempt to access the resource 120 has been made. This message 210 can be sent based on the resource 120 determining that one or more devices have been designated as authentication tokens for proximity-based access.

In some implementations, the resource 120 may include content in the message 210 to facilitate authentication. The message 210 may identify the resource 120, and may indicate the type of access that has been attempted. As another example, the message 210 can include a device identifier for each device that have been registered as authentication tokens for accessing the resource 120. The resource 120 can provide this information so the server 130 can contact each of the registered devices, to cause each to enter an enhanced discovery mode to potentially complete the authentication needed for the access attempted in stage (A). Similarly, if the resource 120 has detected the presence of a device that has been designated as an authentication token for access to the resource 120, the resource 120 can indicate the identity of the device. As another example, the message 210 can indicate the user 102 or credential linked to the attempt to access. For example, if the resource 120 is locked and a particular user is logged in, the identity of the user can be indicated.

In some implementations, the server 130 maintains records of which devices have been designated as authentication tokens for the resource 120, and which devices are associated with different user identities. As a result the server 130 may determine which device(s) can provide proximity-based access for a particular user identity or for a specific resource 120. The message 210 may thus indicate simply that access to the resource 120 has been attempted or that authentication for a particular user identity is needed.

In some implementations, the resource 120 can output a status notification to the user 102 to indicate that automatic proximity-based access is in progress. For example, the status notification can be provided on the "lock screen" (e.g., user interface shown when a device is locked), or on a user interface allowing a user to log in. With to the status notification, controls for an alternative means of authenticating can be shown. For example, a password field can be included so the user 102 can enter a password to gain access to the resource 120. A control for restarting the proximity-based access processing can be included also. For example, a control labeled "try again" can be provided, and when selected by a user, can cause the resource 120 to restart transmitting beacon messages, scanning for nearby devices, and contacting the server 130.

The status notification indicating that proximity-based authentication is in progress can be output in response to the access attempt and a determination that automatic proximity-based access may be possible (e.g., due to the pairing data indicating a device could provide automatic proximity-based authentication). The notification may be an icon, an animation, or other graphical indication. As another example, the resource 120 may display text indicating that authentication is in progress, e.g., "Attempting to unlock your computer," or "Authentication in progress: attempting to contact your phone." The indication or message can change to progressively indicate the current stage of the authentication process, or if an error occurs.

In some instances, user confirmation may be required for authentication and access to the resource 120, in addition to or instead of proximity of the device 110. The server 130 can provide status information to the resource 130 to indicate when additional confirmation is needed, e.g., according to an enterprise security policy or a policy of a specific credential. When user confirmation is needed, the status notification can indicate the need for user action. For example the status notification can provide an instruction to the user 102 to use the device 110 to provide needed confirmation or further proof of identity. For example, the status indication can include a notice, "Please check your phone to unlock," as well as an interactive control for the user to request the confirmation information to be re-sent to the phone.

In stage (C), the server 130 identifies the device 110 as a device that can serve as an authentication token for the access attempted in in stage (A). The information identifying the device 110 can be obtained using information from the message 210 or data stored by the server 130. For example, when the user 102 registers the device 110 as an authentication token for accessing the resource 130, a user identifier for the user 102 and a device identifier for the device 110 can be stored at the resource 120. The message 210 from the resource 120 can thus include the device identifier for the device 110, to indicate which device can provide the needed authentication. Due to the prior registration of the device 110, the resource 120 can send data identifying the device 110 communicating with the device 110 or receiving user input specifying the device 110 at the time access is attempted.

In addition, or as an alternative, when registering the device 110, the user identifier for the user 102 and the device identifier for the device 110 can be transmitted to the server 130 and stored by the server 130 in association with an identifier for the resource 120. Then, when the server 130 receives the message 210 that indicates the resource 120 is being accessed, the server 130 can retrieve the data identifying the device 110 that has been designated as an authentication token for the resource 120.

In some implementations, each resource 120 permits only a single device or a single user or be registered for proximity-based access at any given time. When this is the case, the server 130 can identify that specific device, or the devices of a specific user, as capable of serving as an authentication token. In other implementations, multiple devices or multiple users may be simultaneously registered for proximity-based access with the resource 120. In this case, the server 130 may identify each of the devices that is currently registered to serve as an authentication token for the resource 120.

In stage (D), the server 130 causes a notification 220 to be sent to the device 110 over the network 104. The notification 220 can sent over any of a variety of protocols or networks. For example, the notification 220 can be a silent push notification sent through a cellular network. As another example, the notification 220 can be sent over the Internet, via HTTP or another protocol, using a cellular network, a WI-FI connection, or other network connection. The notification 220 can include data that addresses the notification 220 for the access application on the device 110.

In stage (E), in response to receiving the notification 220, the device 110 changes one or more parameters for transmitting wireless messages. For example, the device 110 can increase the frequency that it transmits wireless advertisements that identify the device 110 over the short-range wireless communication channel 105, to reduce the delay required for other devices to detect the presence of the device 110.

When the notification 220 is received by the device 110, the operating system of the device 110 determines that the notification 220 relates to the access application on the device 110. The operating system passes the information in the notification 220 to the access application. The contents of the notification 220 may include an instruction or command for the application to increase the rate of transmission of wireless messages. Alternatively, the application can be configured to initiate transmitting at an increase rate each time a notification is received or each time the application is active, regardless of the message contents.

If the access application is not currently running on the device 110, the operating system may open the application to enable handling of the notification 220. In many cases, the access application can be already running in the background on the device 110, which further reduces processing delay to complete authentication. As a result of the notification 220, the operating system can grant the access application temporary elevated processing capability, for example, to use device resources more fully to respond to the notification 220. For example, the operating system may, for a short time such as 10 seconds, remove the limitations on the ability of the access application running in the background to use a radio for the wireless communication channel 105. The access application, with the elevated status, initiates periodic transmission of wireless messages or changes a rate at which the transmissions are made using the radio. The access application may change the operating mode of the radio, alter settings, activate a radio that was not being used when the notification 220 was received, or otherwise change the transmission behavior.

In stage (F), also in response to the notification 220, the device 110 sends authentication data 230 to the server 130 over the network 104. The authentication data 230 can include a password or other data that demonstrates authorization to access the resource 120. The authentication data can include, or be generated from, data stored locally at the device 110 prior to receipt of the notification 220, or prior to the attempt to access the resource 120. Thus, because the password was stored earlier, e.g., when registering the device 110 for proximity-based access, the user 102 need not enter the password to the device 110 for the password to be sent by the device 110. As additional examples of authentication data, a password, code, certificate, token, signature, key, or other data that demonstrates the identity or authorization of a user. A user name, account identifier, device identifier, or other login identifier corresponding to a user may be sent, for example, if there are multiple users, accounts, or permission levels for the resource 120.

For example, the device 110 accesses the stored password for the resource 120, e.g., from local storage on the mobile device 110. This may involve accessing encrypted data stored at the mobile device 110 and extracting the stored password. The device 110 encrypts the password using the public encryption key for the resource 120. This can be the encryption key received previously from the server 130, which was specifically associated provided for this particular pairing between the device 110 and the resource 120. For example, it can be a public key for the resource 120 from a public key pair associated with the pairing of the devices

110, 120. The device 110 then sends the encrypted form of the password as authentication data 230 in a message to the server 130.

In stage (G), the server 130 sends the authentication data 230 to the resource 120 over the network 104. The server 130 need not decrypt or assess the validity of the authentication data 230. The server 130 can simply provide, e.g., forward, the authentication data 230 to the resource 120 for processing.

In the example, the authentication data 230 is provided using network connections that exist independent of the wireless communication channel 105. As a result, the authentication data 230 can be provided to the resource 120 before any communication over the wireless communication channel 105 occurs.

In stage (H), the resource 120 processes the authentication data 230. For example, the access control agent running on the resource 120 extracts a password from the authentication data 230. Although the access control agent now has the password that would allow access, the access control agent delays providing this password to the operating system until proximity of the device 110 is verified.

Typically, communications over the network 204, e.g., over the Internet, may have a low latency, e.g., often on the order of a few hundred milliseconds. The delay to establish a connection over the wireless communication channel 105, e.g., Bluetooth, may be much greater, for example, 5 seconds or more. Thus, in many instances, the round trip time from the resource 120 sending the message 210 to receiving the authentication data 230 may be less than the amount of time needed to detect the presence of the device 110 over the wireless communication channel 105 and receive enough transmissions to evaluate the signal strength.

In some implementations, the resource 120 receives the encrypted form of the password that is included in the authentication data 230. The resource 120 decrypts the password received from the mobile device 110, for example, using a specific private encryption key that was received from the server 130 in connection with the pairing with the device 110. Thus, the correct password will only be decrypted if it had been encrypted with the corresponding public key that also matches this pairing with the specific device 110.

In stage (I), the resource 120 detects the presence of the device 110. For example, after the device 110 begins transmitting at the increased frequency, the resource 120 receives one or more messages, e.g., beacon messages or advertisements, from the device 110 over the wireless communication channel 105. The resource 120 determines the identity of the device 110 from a device identifier or other information in the received message. Optionally, the resource 120 may additionally communicate with the device 110 over the wireless communication channel 105 to verify the identity of the device 110, for example, by communicating using the encryption keys established when the device 110 was paired or registered with the resource 120.

The resource 120 compares the signal strength of received messages with a predetermined signal strength threshold representing a minimum distance at which automatic proximity-based authentication is permitted. When the signal strength meets or exceeds the signal strength threshold, the resource 120 determines that the device 110 is within the predetermined level of proximity needed to authorize access to the resource 120. The resource 120 may use multiple transmissions received from the device 110 to evaluate the signal strength over the wireless communication channel 105. For example, the resource 120 may compare an average of multiple signal strength values to the threshold to determine whether the device 110 is sufficiently near to justify providing access.

Because the resource 120 verifies that the device 110 is within the predetermined level of proximity needed to allow access, the device 110 does not need to do so. The device 110 may simply send the repeated advertisement messages announcing its presence, and in some implementations, need not receive or process any communications from the resource 120 over the wireless communication channel 105. Mobile devices are often more power constrained than resources they access, and also may have size constraints or other constraints that limit the size, reliability, and other characteristics of their radios. As a result, relying on the resource 120 to detect transmissions and determine signal strength can provide greater reliability and responsiveness compared to requiring a mobile device, such as a mobile phone, to do so.

In stage (J), the resource 120 provides the user 102 access to the resource 120. For example, after verifying proximity of the device 110 due to the signal strength of transmissions received over the wireless communication channel 105, the access control agent running on the resource 120 provides the decrypted password to the operating system of the resource 120. As discussed above, the access control agent has been delegated the ability to pass passwords to the operating system, without requiring user input through, e.g., the keyboard or mouse of the resource 120. In some implementations, the resource 120 receives or stores a username for the user 102, and the resource 120 also provides the username along with the password.

After the correct password is provided, the resource 120 provides access to the user 102. The resource 120 may automatically unlock, log in the user 102, provide access to a previously-locked user session, or otherwise grant the access that was attempted by the user.

In some implementations, only mobile devices that have been previously been designated or trusted as authentication tokens for a resource 120 are permitted to transmit authentication data to a resource 120. This may be checked by the server system 130 and/or the resource 120. Thus, even if authentication data is valid for accessing the resource 120 (e.g., correct password is provided), the server system 130 and/or the resource 120 may block access to the resource 120 if the authentication data was provided by a mobile device that is not trusted and designated specifically as an authentication token for access to the resource 120. The resource 120 can store identifiers for trusted devices, as well as establish secure (e.g., encrypted) communications protocols during the pairing process. Thus, if authentication data is not encrypted using one of the keys established during pairing, the authentication data is not accepted. Similarly, the server system 130 may maintain records of which devices are designated as authentication tokens for specific resources. In some implementations, the keys established during pairing are generated by the server system 120, and the server system may be able to detect, when authentication data is forwarded, whether the appropriate key has been used. If the appropriate key is not used, the server system 130 may block the authentication data from reaching the resource 120 rather than forwarding the data.

The resource 120 may also require that the mobile device 110 that provides the authentication data to the server system 130 is the same mobile device 110 for which proximity is used to allow access. In other words, the resource 120 may verify that the same mobile device 110 both sent the authentication data and was within proximity of the resource 120.

This can avoid security risks in which one device sends authentication data while a different device appears near the resource 120.

In addition to verifying that the same mobile device 110 both sends the authentication data 230 and enters proximity of the resource 120, the resource 120 may enforce a time limit between the transmission of the authentication data 230 and the detection of proximity of the device 110. For example, when the mobile device 110 sends the authentication data 230, the server system 130 or resource 120 may determine a time when the authentication data 230 is received. The resource 120 may then require the same mobile device 110 that sent the authentication data 230 to enter the predetermined level of proximity within a predetermined time period, e.g., 5 seconds, 15 seconds, 1 minute, etc. If the proximity of the mobile device 110 cannot be verified within an appropriate time window before and/or after the transmission of the authentication data 230 or the sending of the message 210, the resource 120 may deny access. The resource 120 may start the authentication process over with a new message 210 or may require other forms of authentication, such as direct entry of authentication data to the resource 120.

The identity of the mobile device may be verified using device identifiers, verifying the use of a secret key in both the communication link 105 and in sending the authentication data 230, and so on. For example, among other measures, communication between the mobile device 110 and server system 130 may occur in a manner that is tied to a hardware element (e.g., network card media access code (MAC) address, trusted platform module (TPM) identifier, or subscriber identification module (SIM) card). The server system 130 or resource 120 can verify that the device's 110 identity during communication, e.g., by comparing an identifier with a stored identifier, or communicating using a phone number or SIM information tied to a specific device.

In some implementations, the mobile device 110, the resource 120, the server 130, or a combination thereof may identify the credential used for the pairing of the devices 110, 120. Any of the devices may then verify the validity of the credentials and any conditions associated with the credential. This process may include communication with the server 130 to verify that the credential is still valid, unexpired and not revoked, and to determine what rules or policies or conditions currently apply to the credential. The server 130 may return the requested information, and the devices 110 and 120 may verify that the current use of the credential meets the requirements of associated policies. In some implementations, the mobile device 110, the resource 120, or both request verification from the server 130, and the server 130 provides a message indicating whether or not the credential may be used (e.g., is valid, unexpired, and not revoked).

In some implementations, the server 130 or the devices 110, 120 may determine that a second authentication factor is required for access to be granted. As a result, the server 130 may prompt the user to enter a further authentication factor, e.g., voice signal, fingerprint, password, etc. for automatic access to proceed. Alternatively, if a second authentication factor is needed, either by credential policies or suspicious circumstances, automatic access may simply be denied, so that the user 102 is required to enter a password or otherwise authenticate to gain access. In such instances, the resource 120 may simply ignore the presence of the mobile device 110 and maintain standard authentication requirements as if the mobile device 110 were not present.

The devices 110, 120, 130 determine that the conditions for the user 102 to use the credential have been satisfied. Thus, access to the resource 120 may proceed. However, if one or more conditions for using the credential were not satisfied, access would be blocked and processing may end. In some implementations, no notification of the unsuccessful access attempt may be output by either device 110, 120. In other implementations, a message may be displayed on one or both of the devices 110, 120 indicating that access was denied, for indicating a reason to access was denied, for example, indicating the requirement or condition for the credential that has not been satisfied.

At any point in the process shown, the mobile device 110, the resource 120, the server 130, or a combination thereof may perform actions associated with credential that was linked to the pairing of the devices 110, 120. For example, the attempt to access the resource 120 may be logged by the mobile device 110 by sending a message indicating the attempt to the server 130. As another example, the resource 120, may store or send log data to the server 130 in response to messages received from the device 110. This logging, reporting, or any other appropriate action indicated by policies for the credential can be performed before after access has been granted.

Figure 3A:
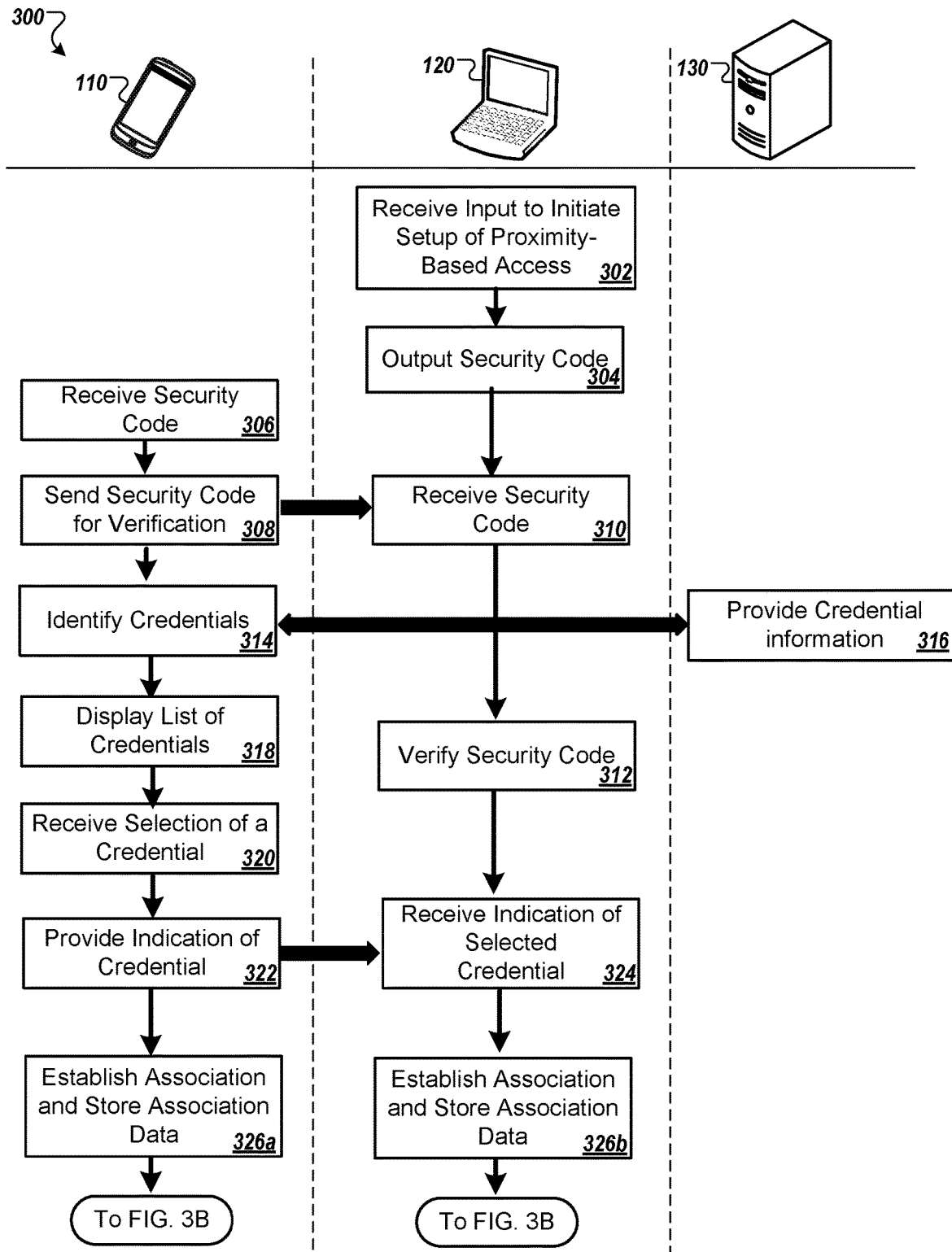
FIGS. 3A-3B is a diagram that illustrates an example of operations to configure proximity-based access.
Figure 3B:
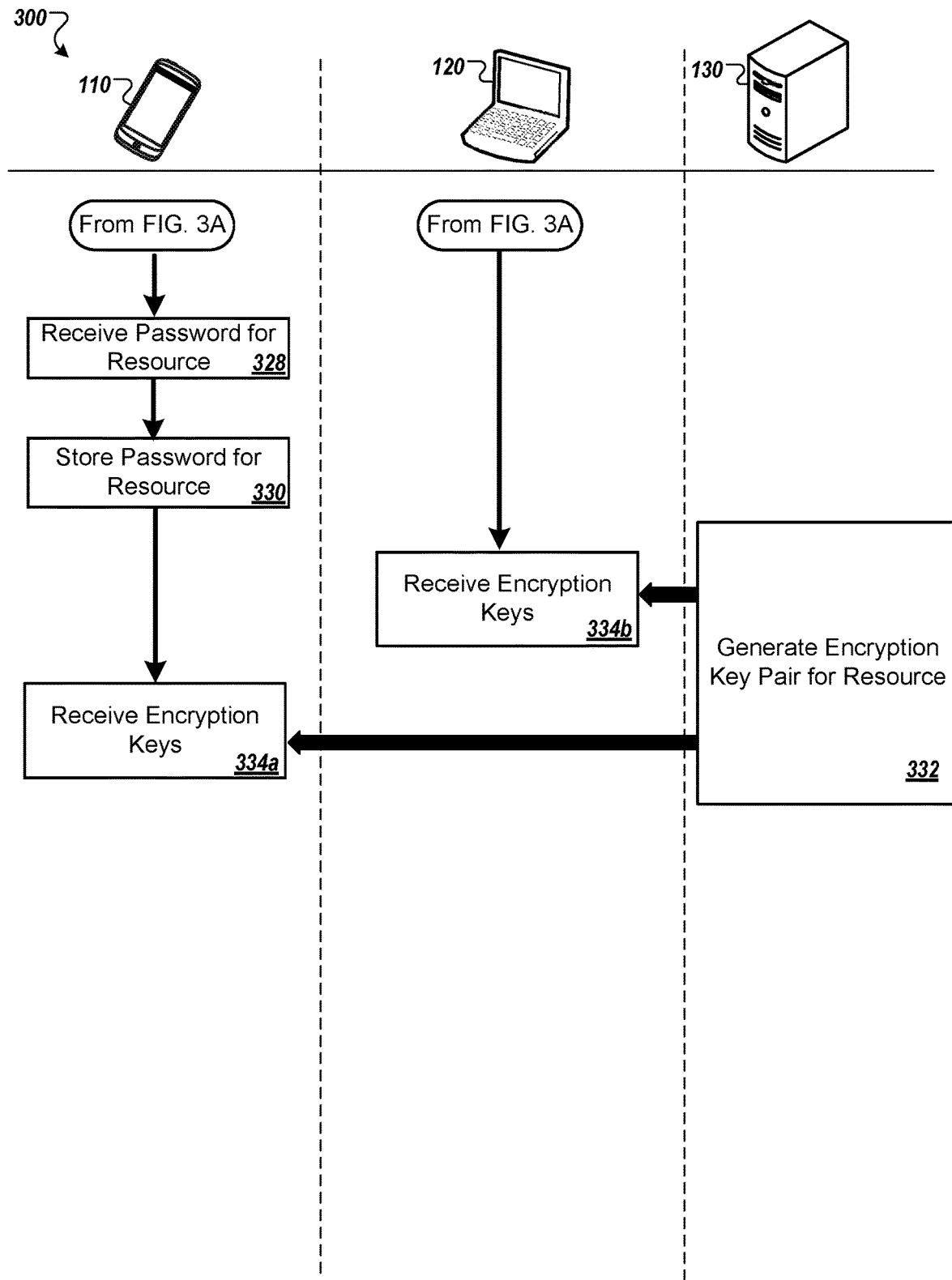

FIGS. 3A and 3B show an example of a process for setting up proximity-based access to a resource 120, such as a computer.

Referring to FIG. 3A, in step 302, the user 102 may login to the resource 120 and indicate that proximity-based access to the resource 120 is desired. For example the user 102 may access an interface of the access control agent running on the resource 120 and select an option to configure proximity-based access.

In step 304, the resource 120 outputs a security code. The resource 120 may generate the security code, or may request a security code from and receive a security code from the server 130. The security code may be, for example, a phrase, a number, or an optical machine-readable code (such as a QR code or a barcode). In some implementations, this code is output by display on the screen of the resource 120, but the code may alternatively the output in another way, for example, an infrared transmission, and NFC signal, an ultrasonic signal, or an audible signal.

In step 306, the mobile device 110 receives the security code that was output by the resource 120. The user may enter the security code into the access application running on the mobile device 110. For example, the user of the device 110 may use a camera at the mobile device 110 to capture an image of a QR code displayed on the screen of the resource 120. This image may be processed by the access application on the device 110 to extract data that can be sent to the resource 120 as verification that the user 102 is present and authorized to perform the configuration. As another example, the user 102 may read the code from the resource 120 and enter the code (e.g., speak or type) to the mobile device 110.

In step 308, the mobile device 110 sends the security code for verification. As illustrated, the mobile device can send the security code to the resource 120 directly, for example, over the wireless connection between the mobile device 110 and the resource 120. Alternatively, the access application on the mobile device 110 can send the security code to the server 130, and the server 130 can relay the security code to the resource 120 along with an identifier for the device 110.

In step 310, the resource 120 receives the security code from the mobile device 110 (e.g., directly or indirectly).

In step 318, the computer verifies that the received security code matches the security code output by the device. In the example of a QR code, the computer determines that the data received matches the data encoded by the QR code. By receiving the same security code that was output locally by the resource 120, the access control agent running on the resource 120 can verify that the mobile device 110 is actually in proximity to the resource 120. Further, receipt of the security code through the authorized channels (e.g., from the server 130 or through a message from the access application) can demonstrate that the user's mobile device 110 is a trusted member of the security platform. For example, this may indicate that the user 102 has logged in or possesses a particular credential needed to be able to use the mobile device 110 for this purpose. The security code may have an associated expiration time. After the expiration time, the security code may be considered invalid, and a new security code would need to be generated, output, and returned to the resource 120 to demonstrate authorization to continue setting up proximity-based device access.

In step 312, the mobile device 110 identifies one or more credentials of the user 102. For example, the mobile device may send a request to the server 130 for updated information about the credentials that are available for the user 102 to access.

In step 314, the server 130 provides credential information to the mobile device 110 over a network. This information may include a list of credentials for the user. In some implementations, the mobile device 110 or the resource 120 contacts the server 130 to indicate that proximity-based access is being configured. For example an identifier for the resource 120 may be provided to the server 130 by either the mobile device 110 or the resource 120. Based on records stored by the server 130, the server may determine which credentials possessed by the user 102 associated with the mobile device 110 are able to be used for creating access to the resource 120. As another example, the access application running on the mobile device and 10 may include, e.g., have previously downloaded, data indicating the credentials possessed were issued to do user 102.

In step 316, the mobile device 110 displays a user interface showing a list of one or more credentials of the user 102. The user 102 may be instructed to select one of the list of credentials for use in the proximity-based access. In some implementations, certain credentials only certain credentials may be used for access certain devices. For example, if the resource 120 is owned and managed by an organization, the access application on the device 110 and the access control agent running on the resource 120 we require a credential issued by the organization to be used for proximity-based access. Further limitations may be applied, for example requiring a certain level of security access, etc.

In step 320, the mobile device 110 provides data indicating the selected credential. For example, the mobile device 110 may provide a credential identifier that indicates the credential. The data identifies the selected credential sufficiently for the resource 120 to specify which credential is selected when communicating with the server 130. The credential identifier or other identifying data may indicate the credential generally (e.g., driver's license for Virginia) or may indicate the specific instance of the credential issued to a specific user (e.g., a serial number or other information indicating the driver's license issued to Mary Smith). The data provided may indicate the issuer of the credential (e.g., Example Corporation), the type of credential (e.g., an employee badge), the user identity the credential is issued to (e.g., a name or other user identifier), one or more resources that the credential provides access to, an identity of or electronic address for an entity that manages the credential, and/or other information about the credential.

In step 324, the resource 120 receives the data sent by the mobile device 110. This data may be sent, for example, over the wireless communication link between the devices 110, 120, or may be sent through respective connections with the server 130. In some implementations, the data may be sent over another communication channel, such as another wireless connection.

In step 326a and step 326b, the mobile device 110 and the resource 120 form an association. This association may be a pairing of the mobile device 110 with the resource 120. Pairing may be performed using the operating system's Bluetooth libraries, and thus may use the native Bluetooth functionality of the device for added security. The mobile device 110 and the resource 120 each store data that indicates the association. This may include typical data used for Bluetooth pairing, such as a link key or other identifier, and may additionally include settings and other data respectively stored by the access control agent and the access application. For example, the data may indicate the specific user 102 and credential used for pairing devices 110, 120. Similarly, the mobile device 110 can store a device identifier for the resource 120, and the device the resource 120 can store and identifier for the device 110.

The pairing of the mobile device 110 with the resource 120, using the access control agent and the access application as described above, indicates that the mobile device 110 should be treated as an authentication factor or token for granting access to the resource 120. For example, the pairing establishes that the presence of the mobile device 110 near the resource 120 can be accepted as evidence of the presence of the authorized user 102 for purposes of granting access to the resource 120. In addition, the credential that is associated with the pairing of the devices 110, 120, ties access to the resource 120 using this proximity authentication factor to the requirements, conditions, policies, and management features of the credential. For example, the pairing and the use of the device 110 as an authentication factor can be restricted use of the credential is restricted. If the credential is revoked or if it expires, the pairing between the devices can be automatically canceled or suspended until the credential is valid and active. Actions to automatically cancel or suspend access can be performed by the resource 120 and/or the server 130. In some instances, the access control agent 120 and/or the access application may refuse to provide access to the resource 120 if it is determined that the credential is no longer valid. Additionally, if use of the credential is limited to a certain time range, e.g., certain hours of the day or days of the week, the use of the device one tend to gain access to the resource 120 is limited in the same way.

In some implementations, a limited set of credentials can be used to form an association between the mobile device 110 and the resource 120. For example, if the resource 120 is owned by a company, a policy can be set to limit the credentials that can support an association to only credentials issued by the company. Similarly, only credentials corresponding to certain roles or access privilege levels may be permitted to be used to form an association for proximity-based access. For example, a credential for guests or visiting vendors may not be permitted to be used, while credentials of employees having at least a minimum access privilege may be designated as being eligible to be used for pairing for proximity-based access. If the user 102 selects an ineligible credential, or if no eligible credential has been issued to the user 102, the pairing request may be blocked so that proximity-based access is not permitted for the user 102 and the mobile device 110. Thus, establishing an association between the mobile device 110 and the resource 120 can be limited to credentials that satisfy certain predetermined conditions, which can be set in advance by the organization that owns or manages the resource 120.

In step 328, the mobile device 110 receives a password for accessing the resource. The access application of the mobile device 110 can present an interface to the user, after pairing with the resource 120, requesting the user's password for the computer 102. This password can later be provided to the resource 120 to gain access, for example, to unlock the resource 120, to login to the resource 120, or to perform another authorization action.

In step 330, mobile device 110 stores the password the user 102 entered. In some implementations, the password is stored locally at by the mobile device 110. The mobile device 110 can encrypt the password and store the encrypted password to prevent unauthorized access to the password. In some implementations, the user enters, and the mobile device 110 stores, a user name or other information that can also be provided to gain access to the resource 120.

In step 332, the server 130 generates and sends encryption keys to the resource 120 and the mobile device 110. In some implementations, the server 130 may send the encryption keys separately, with resource 120 and the mobile device 110 each communicating with the server 130. Once pairing between the mobile device 110 and the resource 120 has been completed, the access application of the mobile device 110 or the access control agent of the resource 120, or both, may notify the server 130. In response, the server 130 may generate encryption keys that will be used when providing data between the mobile device 110 and the resource 120.

The server 130 creates a public key/private key pair for the mobile device 110 and for the resource 120. The server 130 sends each device 110, 120 its own private key, and the server 130 sends each device 110, 120 the public key to the other device. For example, the mobile device 110 receives a private key for the mobile device 110 and a public key for the resource 120. The encryption keys can be generated and stored specifically for the association being formed. These keys can be used in addition to standard message-level keys that encrypt all communications over a channel. Further, use of the correct key by the mobile device 110 can further demonstrate that the user mobile device 110 is the correct, authorized device that has been paired as an authentication factor.

In steps 334a and 334B, the mobile device 110 in the computer system 120 respectively receive their respective encryption keys from the server 130. The devices 110, 120 save the encryption keys for later use in communicating to provide proximity-based access.

In some implementations, the server 130 stores information about the pairing or association between the mobile device 110 and the resource 120. For example, a record of the association and the credential tied to the association can be stored. The server 130 may apply various policies or actions rules to manage the association. For example, the server 130 may communicate with the access application on the mobile device 110 or the access control agent 120 on the resource 120 and adjust the behavior of the systems. If the user 102 loses his mobile device 110 for example, the server 130 may communicate with the access application or the access control agent or both to cancel the association, thereby removing the mobile device 110 from being an authentication tractor to access the resource 120.

While various operations are shown in FIGS. 3A and 3B to be split between the device 110 and the resource 120, some operations may be performed by different devices then is illustrated. For example, steps 312, 316, and 318 may be performed using the resource 120 instead of the mobile device 110. In this manner, the user may view a list of credentials and indicate a credential to use for proximity-based access through an interface of the resource 120, and not the device 110. As another example, a user may initiate configuration of proximity-based access using device 110 in step 302, instead of at the resource 120.

FIGS. 4A to 4H show various user interfaces that can be used to configure proximity-based access.

Figure 4A:
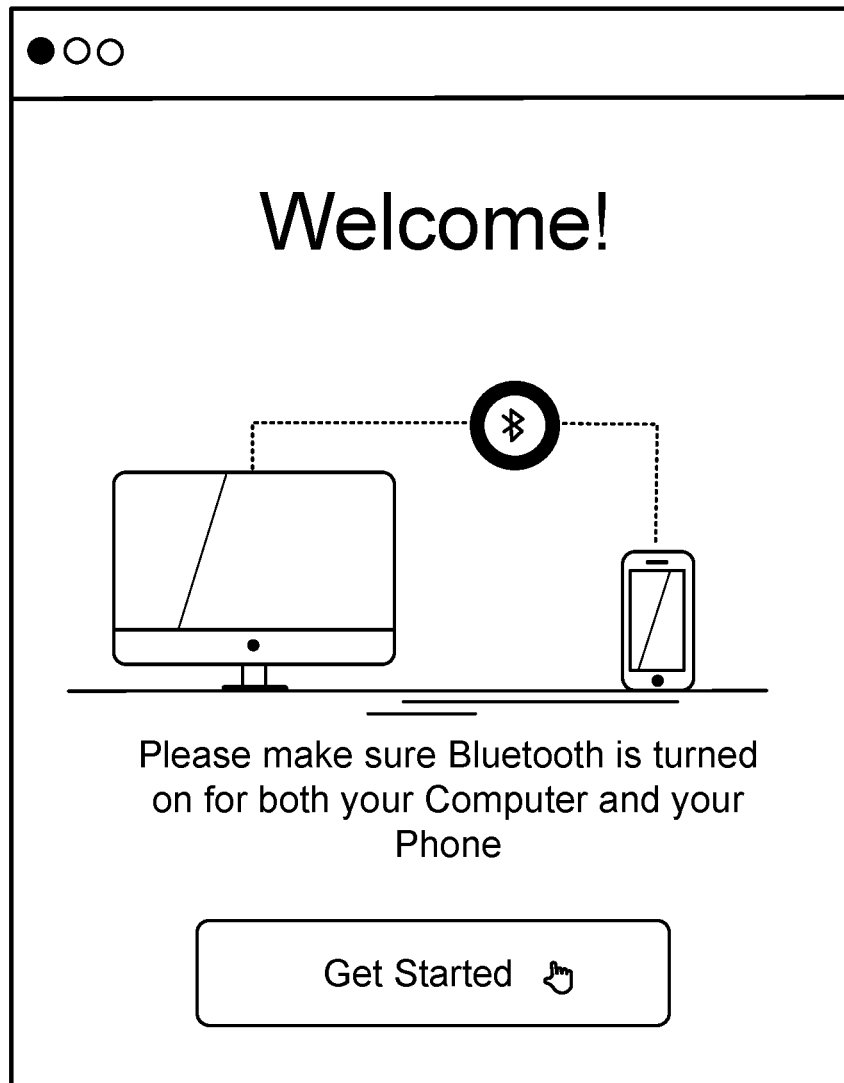
FIGS. 4A-4H are diagrams illustrating user interfaces for configuring proximity-based access.

FIG. 4A shows an interface of an access control agent of a resource, such as a resource 120. The interface invites the user to make sure that Bluetooth is enabled for both the computer and the user's device, e.g., a phone. The user can click the "get started" control to proceed configuring his phone as an authentication factor.

Figure 4B:
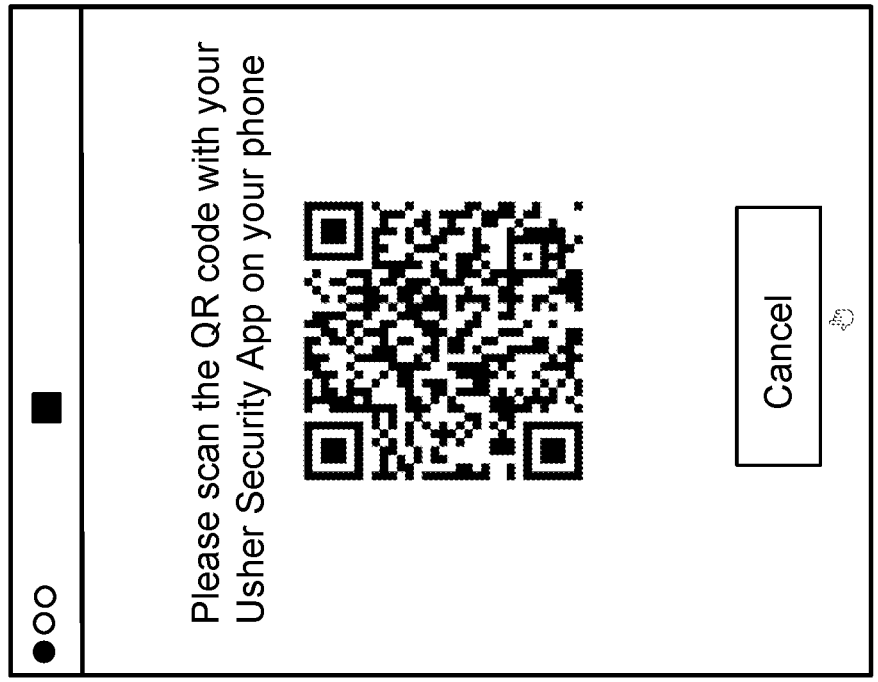
Figure 4B:
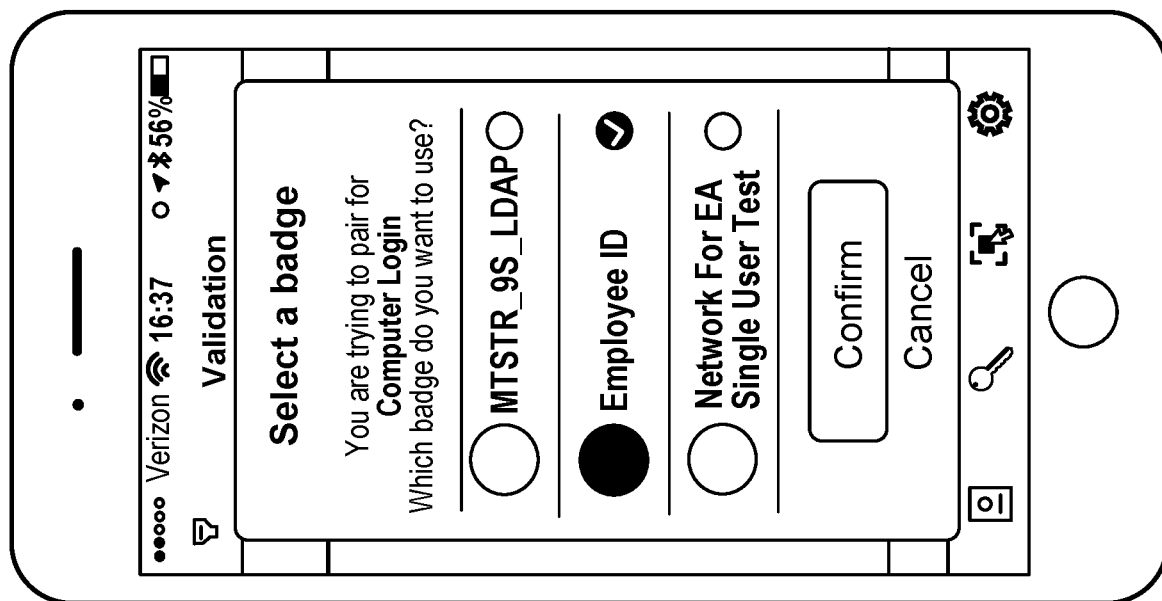

FIG. 4B shows a user interface of the user's phone on the left, and an interface on the resource device on the right. After the user clicks the "get started" button, the computer shows a QR code and instructs the user to scan the QR code with the user's phone. The QR code can be a code provided by the server 130. The user interface can also show a timer, e.g., an animation or numerical countdown, to indicate an amount of time before the QR code expires, e.g., 1 minute after being displayed. When the user scans the QR code, image data representing the QR code is received by the access application on the phone. Data encoded in the QR code is extracted and provided to the server 130, which can verify that the extracted data from the phone matches the data encoded in the QR code the server 130 provided to the computer. The match verifies that the phone is near the computer and allows the phone to be used for the pairing.

The phone then obtains a list of credentials issued to the user, e.g., from server 130. The interface on the phone allows the user to select one of the credentials to use in pairing the phone with the computer. In some implementations, a valid credential is required to use the phone as authentication factor.

Figure 4C:
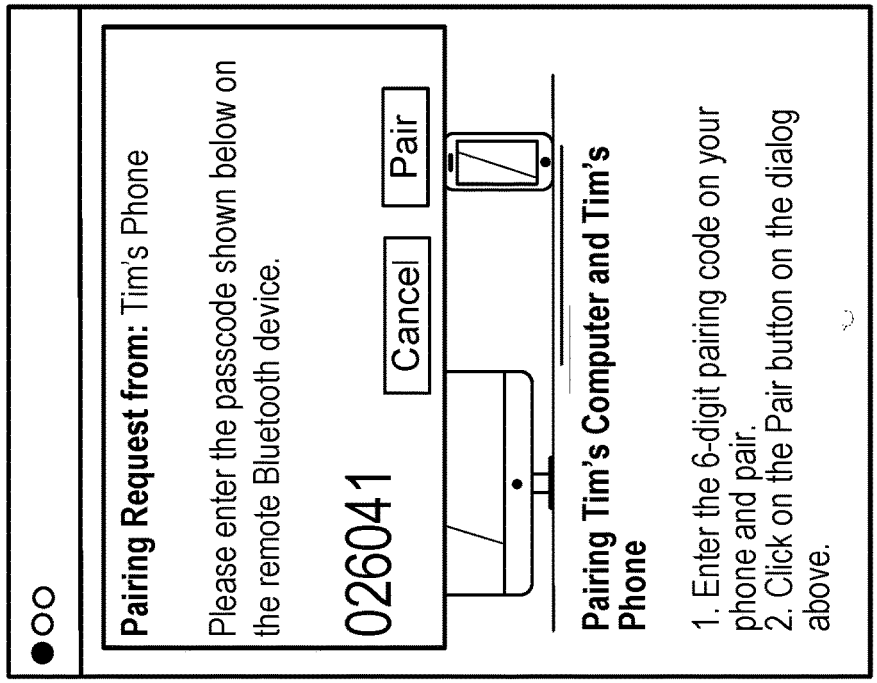
Figure 4C:
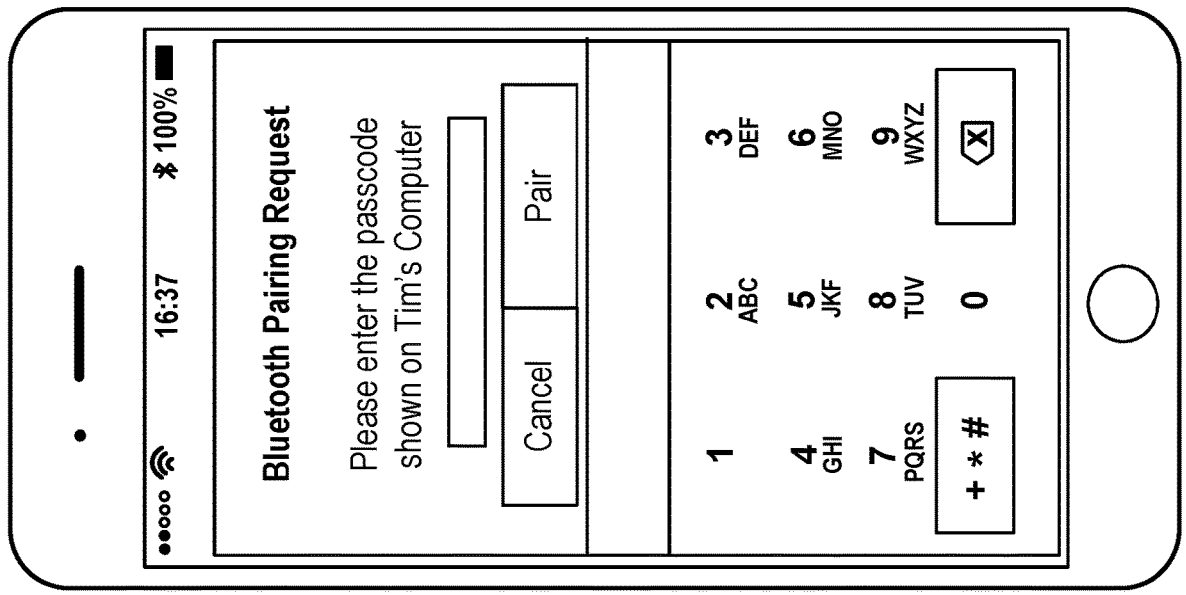

In FIG. 4C, the computer shows a different type of code. The computer shows a six-digit number in this instance, and the phone displays an interface to receive this passcode. In some implementations, this may be a Bluetooth passcode that is used to establish pairing.

Figure 4D:
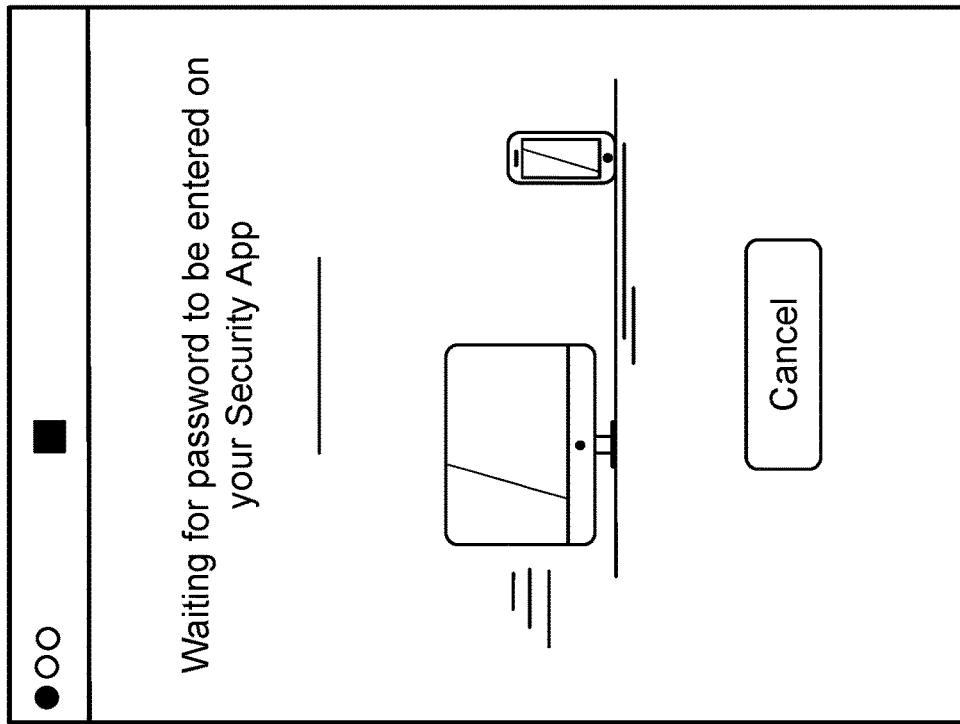
Figure 4D:
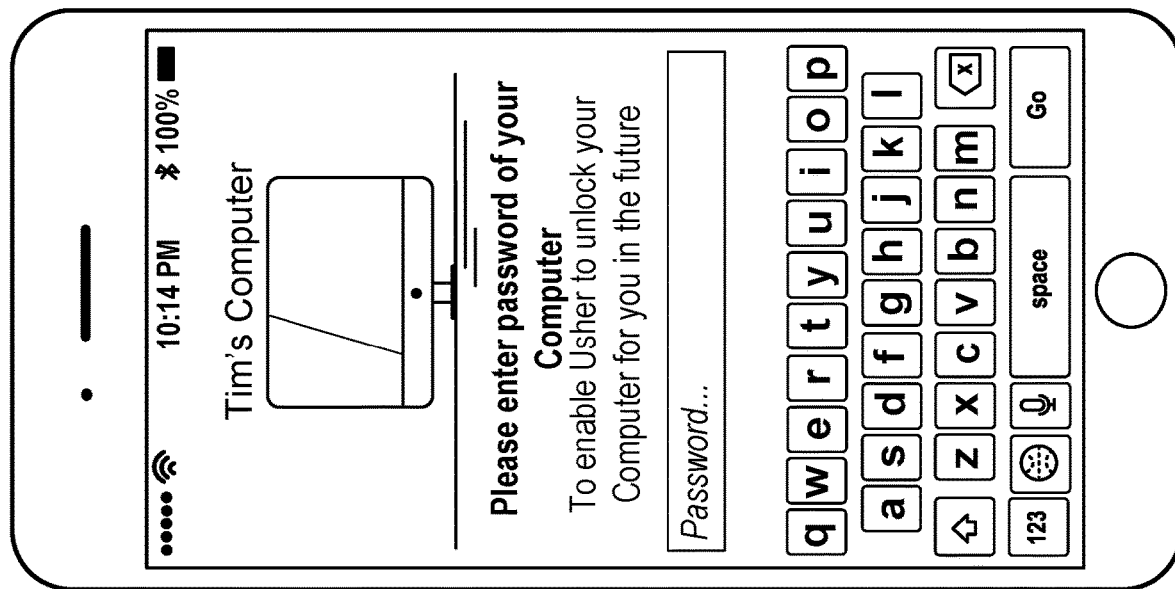

In FIG. 4D, the interface of the phone asks the user to enter the password for accessing the computer (e.g., the password for the user's user account on the computer). The interface of the computer indicates that the next step is for the password to be received through the phone in the access application of the phone.

Figure 4E:
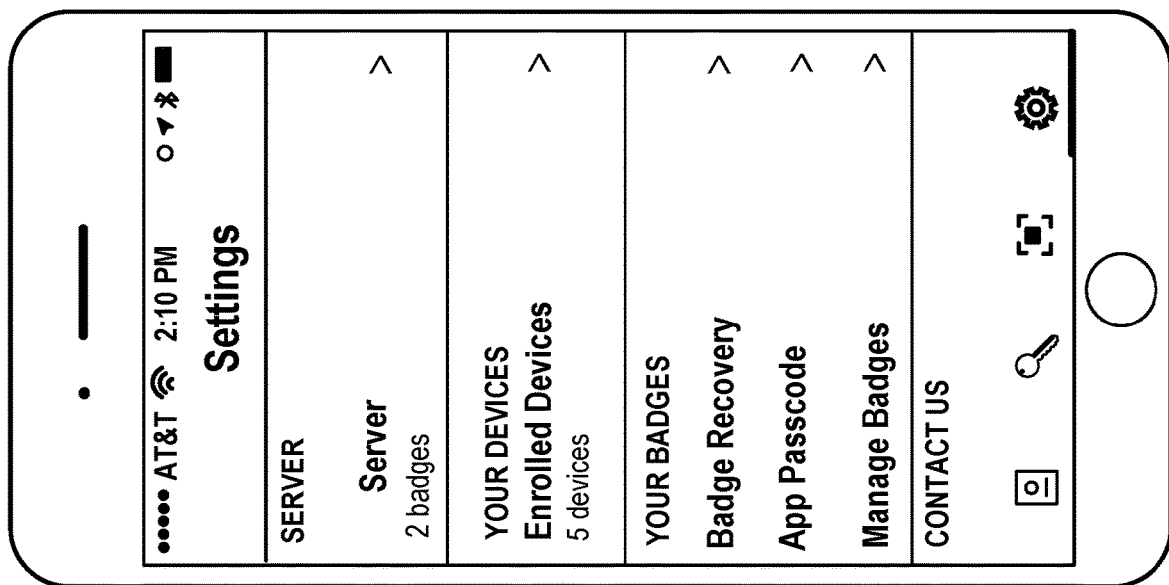
Figure 4E:
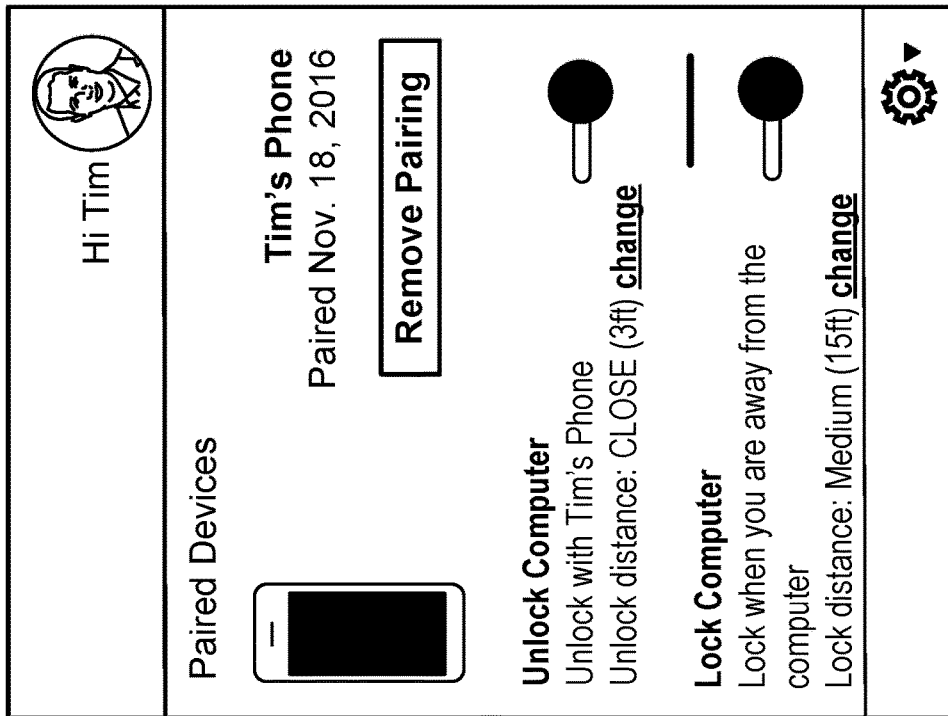

In FIG. 4E, the pairing of the phone and the computer, and the designation of the phone as an authentication factor for accessing the computer, have been completed. The interface of the computer shows status information for paired devices, for example, the device name and the date pairing occurred. The interface also includes an option to remove the pairing, and thus remove automatic access based on proximity of the phone. The interface of the computer also shows controls for setting the behavior of locking and unlocking. For example, the user may adjust a slider control to set a distance between the phone and the computer at which unlocking or locking should occur. In this instance the user has sent that unlocking should not occur until the user is close, for example, approximately 3 feet from the computer.

Similarly, the user may set a distance for locking the computer when the user moves the phone away. In this instance, the computer is set to lock itself automatically when it detects that the phone is has moved at least 15 feet away. During this process, the user may be instructed to move the phone to a distance corresponding to the desired lock or unlock position, and the computer can measure the signal strength at those locations. This information can be used to set or verify the signal strength thresholds corresponding to the desired distances for future use. The interface of the phone shows a status of the access application, including badges or credentials issued to the user, enrolled devices for the user account, and so on. In some implementations, the user may be able to access, modify, or remove pairing of the phone with other devices from this interface also.

Figure 4G:
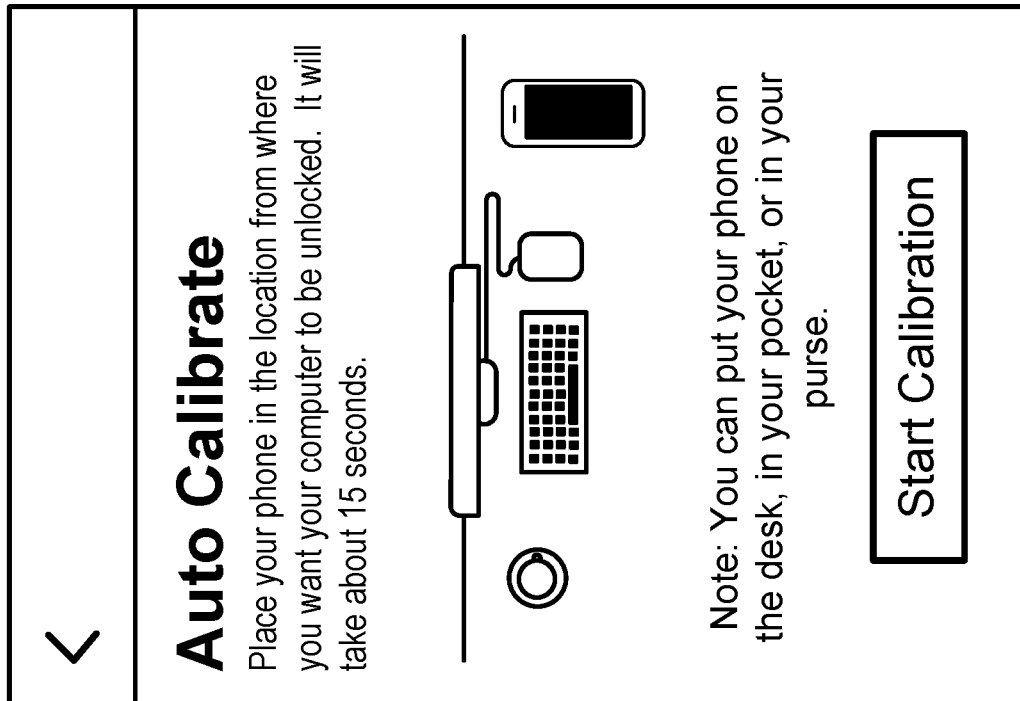
Figure 4F:
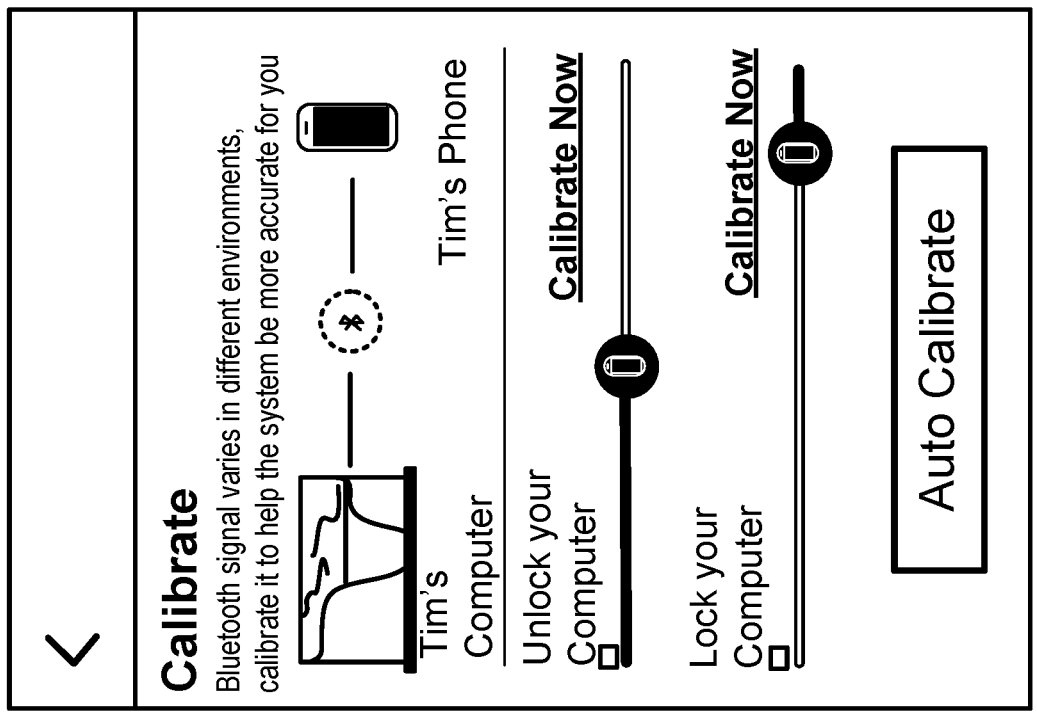

FIG. 4F shows an interface for calibrating the locking and unlocking behavior of the computer. In this example, the user can use sliders to adjust the distance thresholds for locking or unlocking. The user may alternatively select the auto-calibrate control to automatically calibrate the locking and unlocking.

FIG. 4G shows an auto-calibration interface for unlocking behavior. The interface instructs the user to place the phone in a location where the user would want the computer to become unlocked. Once the user clicks the "start celebration" button, the computer will perform a series of signal strength measurements to determine appropriate signal strengths that represent the distance between the computer and the phone that the user has sent. The computer will save the signal strength information in association with the pairing of the computer with the phone, and compare signal strength that is later detected with the baseline signal strength determined during the auto-calibration period.

Figure 4H:
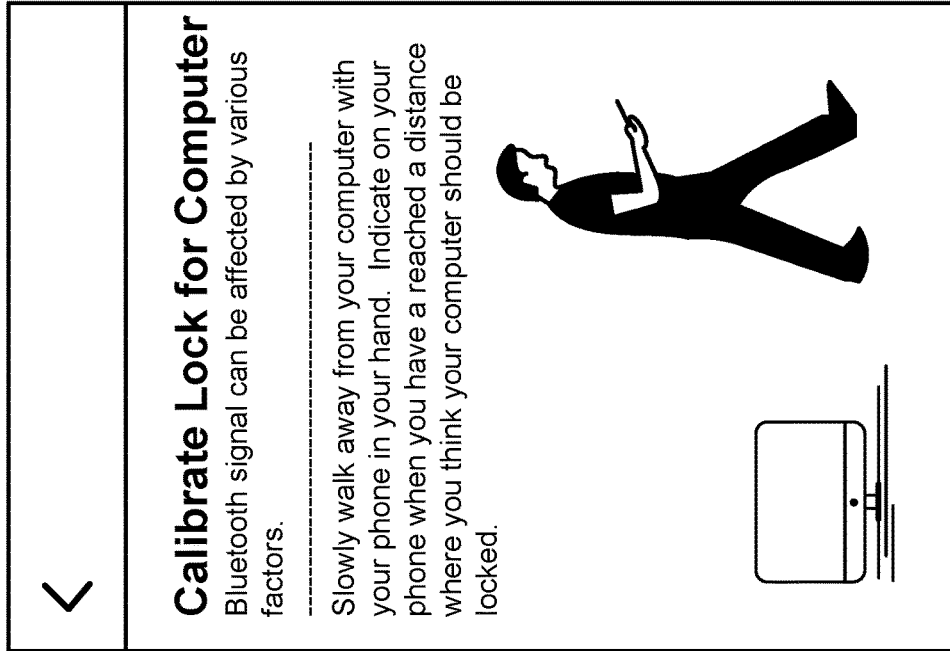
Figure 4H:
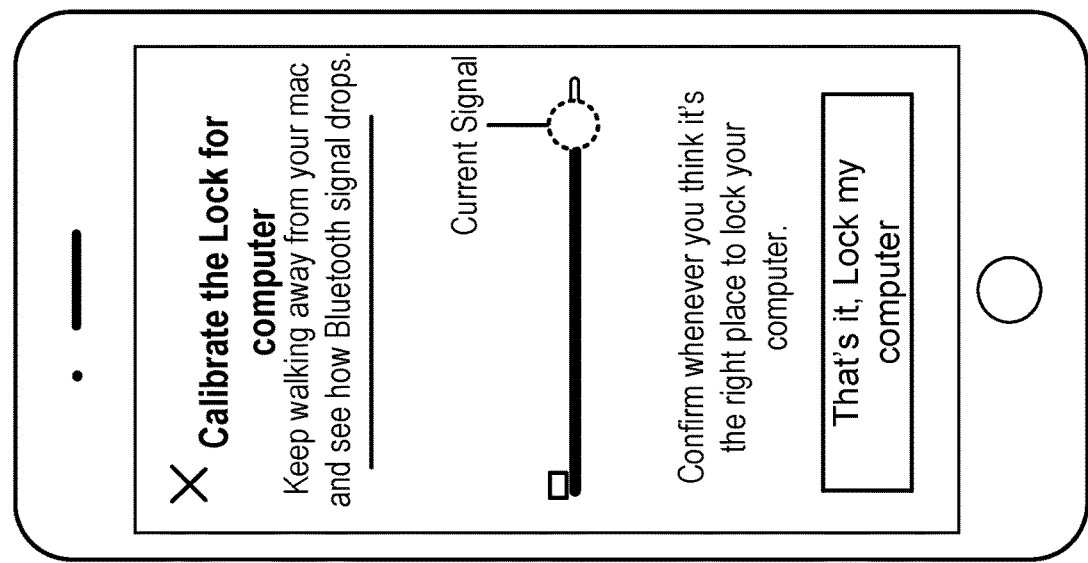

FIG. 4H shows interfaces for calibrating the automatic locking functionality of a computer or other resource. The interface of the computer instructs the user to slowly walk away from the computer with the phone exposed. The phone shows an interface that allows the user to indicate, by interacting with a button on the interface of the phone, that the phone is at a distance where locking should occur. The interface of the phone also shows a signal strength meter showing the current signal strength as the user moves.

In some implementations, the process of pairing or registering a mobile device to serve as an authentication token for proximity-based access to a particular resource can be simplified. For example, the resource may display an interface such as shown in FIG. 4A, and then an interface such as shown on the right side of FIG. 4B. After a user scans the QR code with a mobile device, a server system in communication with both the mobile device and the resource may receive data extracted from the QR code and verify that the extracted data matches the data in the QR code the server system sent for display at the resource. The server indicates to the resource that verification was successful, and then the resource may display, on the resource, an interface for the user to enter a password to access the resource. As a result, rather than require the user to enter the password for the resource into the mobile device directly, the system can allow the user to enter the password for the resource at the resource, e.g., to an interface of the user agent executing on the resource. The resource may then send the entered password, or a token or encrypted data representing the password, to the server system, which in turn may provide the password (or token or encrypted data) for storage at the mobile device, until the mobile device needs to send data to unlock the resource.

Figure 5:
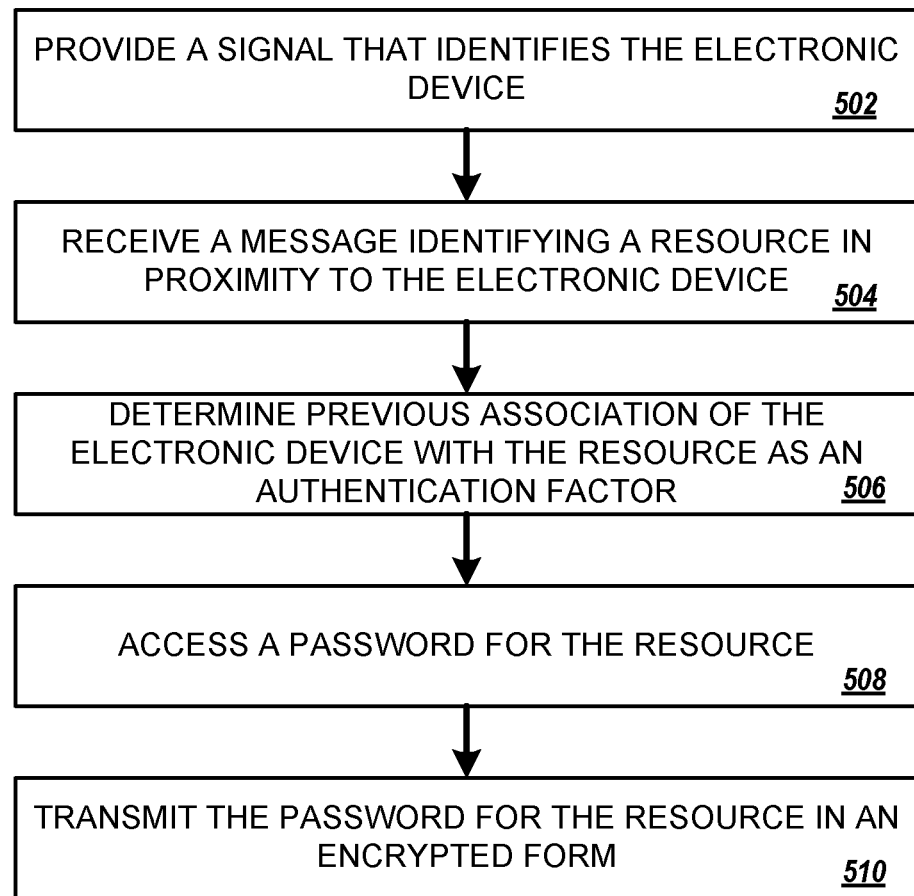
FIGS. 5 and 6 are flow diagrams that illustrates methods for proximity-based access.

FIG. 5 illustrates an example of a process 500 for providing proximity-based access. In some implementations, the process is performed by a phone or other mobile device 110 to access a resource 120, such as a computer.

The electronic device provides a signal that identifies the electronic device over a wireless communication link (502). The electronic device can have features as discussed for device 110 above. In some implementations, the wireless communication link is a direct wireless communication link, such as a Bluetooth communication link. The wireless communication link may be a direct WI-FI link or other wireless link. In some instances, the wireless signal is a Bluetooth beacon message, and wherein the electronic device was previously paired with the resource over a Bluetooth connection.

The electronic device receives a message from a resource in response to the wireless signal (504). The received message may identify a resource 120 in proximity to the electronic device.

The electronic device determines that the electronic device has been previously associated with the resource as an authentication factor for accessing the resource (506). For example, the electronic device may look up records of associations between the electronic device and resources in data stored at the electronic device.

In response, the electronic device accesses a password for the resource that is in proximity to the electronic device (508). This can include accessing the password from local storage of the electronic device. For example, the electronic device can access a stored version of the password for the resource that has been stored in the encrypted form in local storage of the electronic device. As another example, the electronic device can store a public key for the resource and the password for the resource, and the electronic device can generate the encrypted form of the password using the public key for the resource.

In some implementations, the resource is a computer, the electronic device is a mobile phone, and the password is a password for a user account for accessing the computer, e.g., a password for an operating system of the computer.

The electronic device transmits the password for the resource over the wireless communication link in an encrypted form to obtain access to the resource (510). Other actions can also be performed as discussed herein.

In some implementations, before the steps of the process 500, the electronic device is associated with the resource in connection with a credential issued to the user. The credential can have an associated policy that requires a second authentication factor when one or more conditions occur. The resource, the electronic device, and/or a server system can store data that links the credential to the association between the electronic device and the resource. Similarly, the resource, the electronic device, and/or a server system can store data that specifies the policy corresponding to the credential, and appropriate data to require proximity-based access to satisfy the policy specified for the credential.

During the process 500, the resource, the electronic device, and/or a server system may determine that one or more conditions for automatic access have not been satisfied, for example, the electronic device may be brought into proximity of the resource outside a designated time or location in which automatic access is allowed. As another example, events or environment characteristics may trigger an authentication requirement according to the security policy for the credential. Security requirements for credentials can be set as positive or negative requirements, e.g., enabling automatic access only within a defined area, or disallowing automatic access outside a defined area. Failure to satisfy any requirement can block use of the credential, and thus block automatic access based on proximity of the first electronic device to the resource.

When the conditions corresponding to the credential are not met, the resource or the server system may send a message to the electronic device indicating that a second authentication factor is required. Thus the electronic device can receive a message sent in response to a determination that the one or more conditions of the policy have not been satisfied, the message indicating that the second authentication factor is required. The electronic device can provide a notification requesting user input for the second authentication factor, e.g., a password for the electronic device or a user account of the user, a biometric input such as a voice password, a fingerprint scan, a face image, an eye scan, etc. After providing the notification, the electronic device can receive user input for the second authentication factor, and the electronic device can provide the user input for the second authentication factor to a server system.

In some instances, the electronic device determines, in response to determining that the electronic device has been previously associated with the resource, that the one or more conditions of the policy associated with the credential have been satisfied, such that automatic access to the resource is appropriate. Transmitting the password for the resource in encrypted form can be performed in response to determining that the one or more conditions of the policy associated with the credential have not occurred.

In some implementations, the electronic device performs various actions in response to determining that the electronic device has been previously associated with the resource. These actions may include: determining, by the electronic device, that the association of the electronic device with the resource is linked to the credential; determining, by the electronic device, that the credential has the associated policy that requires the second authentication factor when the one or more conditions are not satisfied; and determining, by the electronic device, that the one or more conditions of the policy have not been satisfied. In response to determining the one or more conditions of the policy have not been satisfied, the electronic device can request user input for a second authentication factor, and verify the validity of the second authentication factor based on user input received in response to requesting the user input. The electronic device transmits the password for the resource in response to verifying the validity of the second authentication factor, e.g., determining that the user input matches a reference for the user. For example, verifying validity may include receiving an indication that a biometric identifier matches a known biometric identifier of the user, or that an entered password matches a stored password for an account of the user.

In some implementations, the electronic device identifies a credential corresponding to the association of the electronic device with the resource. The electronic device can also identify a reporting policy corresponding to the credential. The electronic device can then transmit information specified by the reporting policy corresponding to the credential. The transmission may be triggered by receiving the message identifying a resource in proximity to the electronic device, by transmitting the password for the resource in an encrypted form, and/or another action of the process. In some implementations, the reporting policy directs transmission of geolocation data, beacon data (e.g., data from beacon messages received), application context data, movement data (e.g., data indicating location, orientation, and motion patterns of the electronic device), or authentication history data. Transmitting the information can include transmitting the data that the policy specifies to a server system over a network.

Figure 6:
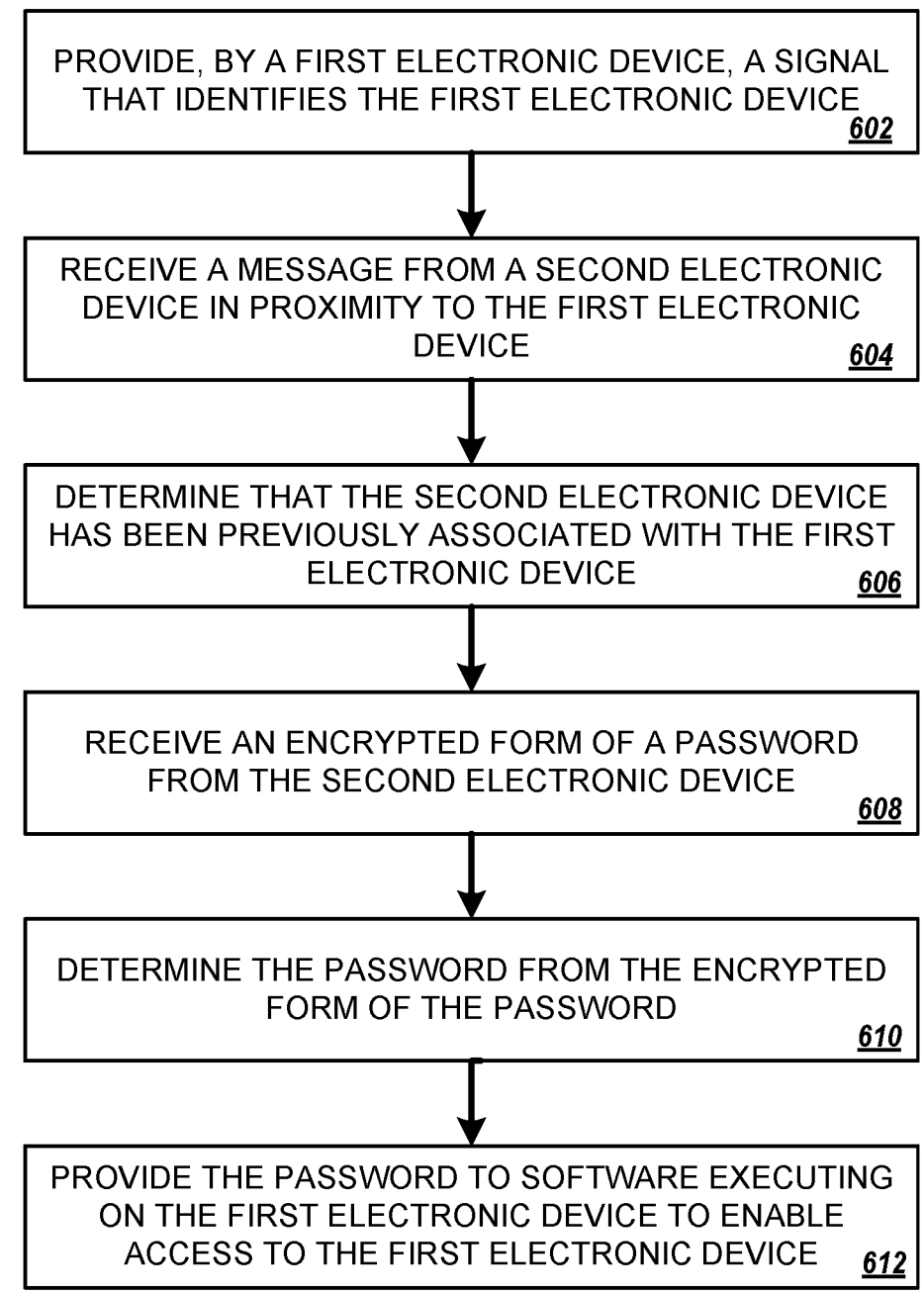

FIG. 6 is a flow diagram that illustrates an example of a process 600 for carrying out proximity-based device access. The process 600 may be performed by, for example, a computer or other resource 120. In some implementations, the first electronic device is the resource that is configured to grant access in response to detecting proximity of a previously-associated device that has been designated as an authentication token. The second electronic device may be a phone or other mobile device.

The first electronic device, e.g., resource 120, provides a signal that identifies the first electronic device over a wireless communication link (602). For example, this may be a beacon message, advertisement message, or other message. In some implementations, the transmission of this signal can be omitted. For example, the resource 120 may not broadcast a signal, and may instead wait to receive a signal from an appropriate device 110. Nevertheless, in some implementations, a device 110 may use signal strength to determine its proximity to the resource 120, and thus may benefit from receiving a signal from the resource 120. The device 110 may verify proximity to the resource 120 in addition to or instead of the resource 120 verifying proximity.

The first electronic device receives, over the wireless communication link, a message from a second electronic device, e.g., device 110, that is in proximity to the first electronic device (604). The first electronic device, e.g., resource 120, determines whether the second electronic device is within a threshold level of proximity based on signal strength of one or more signals received from the second electronic device over the wireless communication link. For example, the first electronic device can determine whether the signal strength satisfies a predetermined signal strength threshold, e.g., whether the signal strength is greater than a minimum amount. If the first electronic device determines that the threshold is satisfied, and thus that the minimum level of proximity is achieved, the process continues. If the first electronic device determines that the threshold is not satisfied, and thus the second electronic device is too far away, then the first electronic device does not continue the process and does not allow automatic access.

The wireless communication link can be a direct wireless link, such as Bluetooth or other radiofrequency communication link. In some implementations, a wireless link may be established through one or more intermediate devices. In such implementations, other forms of verification of the actual physical proximity of the second electronic device may be used. For example, the second electronic device may need to provide evidence that it detected local beacons that would allow triangulation of a position, or GPS or other position data may be required.

The first electronic device determines that the second electronic device has been previously associated with the first electronic device as an authentication factor for accessing the first electronic device (606). For example, it may be determined that the two devices were previously paired using Bluetooth. In some implementations, it the first electronic device determines that the devices were paired for the purpose of allowing proximity-based access, e.g., that during the pairing process the second electronic device was specifically designated to be an authentication factor for a particular user or user credential. This may be demonstrated by the a device communicating using a link key established during pairing of the second electronic device with the first electronic device using hardware-level Bluetooth pairing managed by the operating system of the first electronic device.

The first electronic device receives an encrypted form of a password from the second electronic device over the wireless communication link (608).

The first electronic device determines the password from the encrypted form of the password (610). For example, the first electronic device may access an encryption key that is stored and designated for use with the particular pairing with the second electronic device. The first electronic device may store multiple different encryption keys to use for different paired devices. Each pairing may use a different encryption key to decrypt received passwords.

The encryption can be asymmetric encryption. The encrypted form of the password includes receiving an encrypted password that was encrypted using a public key of the first electronic device, e.g., a public key that was provided to the second electronic device by a server system that manages the credential linked to the association between the first electronic device and second electronic device. The first electronic device can decrypt the encrypted password using a private key of the first electronic device that is stored at the first electronic device. The public and private key used can be unique to the association between the devices, and in some implementations is not used for communicating with any other devices or for communicating with the second electronic device for purposes other than authentication.

The first electronic device provides the password to software executing on the first electronic device to enable access to the first electronic device (612). For example, an agent running on the first electronic device can provide the password to an operating system of the first electronic device.

The first electronic device can provide the password to the operating system or other software in response to determining that the signal strength between the two devices satisfies a threshold, e.g., exceeds a minimum value. The first electronic device may not allow access if the signal strength is too weak. The first electronic device may determine the signal strength or distance between the devices at multiple times during the process 600 to verify proximity.

In some implementations, different devices may have different corresponding signal strength thresholds set to use in determining whether an appropriate level of proximity has been achieved. For example, a first electronic device may apply different thresholds for different devices that are designated as authentication factors. These thresholds may be set based on user input, calibration for each device, or other factors. As an example, the first electronic device can identify the second electronic device or a user associated with the second electronic device based on the message from the second electronic device. The first electronic device can access data indicating a signal strength threshold designated for the second electronic device or a user associated with the second electronic device, wherein the signal strength threshold indicates a signal strength that represents a user-selected level of proximity for providing access to the first electronic device. The first electronic device can then determine whether the signal strength satisfies the signal strength threshold corresponding to the user-selected level of proximity.

As a result of receiving the password, the first electronic device may verify that the password is correct and may provide access to the user. For example, the first electronic device may unlock an active user session of the first electronic device. Providing access may include unlocking a user interface of the first electronic device, initiating a new user session on the first electronic device, resuming an existing user session on the electronic device, authenticating a user to the first electronic device, or logging a user into a user account. Thus, in response to providing the password, the first user application can provide a user access to a user interface of the first electronic device that was unavailable prior to providing the password. The access can be provided without user input being entered to the first electronic device between receiving the message from the second electronic device and providing access to the user interface.

In some implementations, the message from the second electronic device is received while an interface of the first electronic device is locked and a user session for the first electronic device is active. An access control agent on the first electronic device can provide the password received from the second electronic device to an operating system of the first computing device or other software to unlock the first computing device and grant access to the user session.

In some implementations, receiving the encrypted form of the password, determining the password, and providing the password are performed by an agent executing on the first electronic device. The agent runs along with an operating system of the first electronic device, and the agent has permission to provide passwords to the operating system of the first electronic device, e.g., on behalf of a user and without any user input to the first electronic device. To enable access to the first electronic device, the agent executing on the first electronic device can pass the password to the operating system of the first electronic device. Thus, in response to providing the password, the first electronic device can provide a user access to a user interface of the first electronic device that was unavailable prior to providing the password, the access being provided without user input being entered to the first electronic device between receiving the message from the second electronic device and providing access to the user interface.

As the second electronic device moves away, the first electronic device may lock itself or otherwise restrict access in response. For example, after access has been allowed, the first electronic device may determine a signal strength of the wireless connection between the first electronic device and the second electronic device. It may also determine that the signal strength satisfies a threshold level (e.g., decreases to or below a predetermined level), where the threshold level corresponds to distance to automatically restrict access to the first electronic device. As a result, an access control agent can restrict access to the first electronic device (e.g., by locking a user session, logging out the user, etc.) in response to determining that the signal strength satisfies the threshold level. Customized thresholds can be set for different paired devices, which typically represent different users. The first electronic device can store and access the appropriate signal strength thresholds for the current paired device that is in communication with the first electronic device.

In some implementations, the first electronic device can identify the second electronic device or a user associated with the second electronic device. The first electronic device can access data indicating a signal strength threshold designated for the second electronic device or a user associated with the second electronic device. The signal strength threshold can indicate a signal strength that represents a user-selected distance level for automatically restricting access to the first electronic device. The first electronic device can automatically restrict access to the first computing device based on determining that the signal strength satisfies the signal strength threshold, e.g., is less than a minimum signal strength required for maintaining access to the first electronic device.

In some implementations, the first electronic device identifies a user credential corresponding to the association of the second electronic device with the first electronic device. This credential can be one issued to a particular user associated with the second electronic device. The first electronic device can determine whether the user credential corresponding to the association is valid, and only provide access if the credential is valid. To do this, the first electronic device may communicate with a server over a network, and provide a request for verification of a particular credential of a particular user. Providing the password may be performed in response to determining that the user credential corresponding to the association is valid.

In some implementations, providing the password to grant access to the first electronic device can be based on verifying that one or more additional conditions on use of the credential are satisfied. For example, even while a credential is valid (e.g., the credential is issued to the user, is not revoked, and has not expired), the credential may have conditions that limit when and how the credential can be used, e.g., use may be restricted to certain times of day, certain days of the week, certain locations, certain rooms or floors of a building, and so on. Similarly, a security policy associated with the credential may restrict access that is different from a user's typical pattern of access, or may restrict a number of times the credential can be used. In some implementations, when the conditions on use of the credential are not satisfied, use of the credential is blocked. In other implementations, use of the credential is allowed when the conditions are not satisfied, but stricter authentication requirements are imposed, e.g., additional authentication factors are required.

In some implementations, the first electronic device identifies a security policy corresponding to the user credential, the security policy specifying one or more conditions that limit use of the user credential while the user credential is valid and unexpired. This security policy can be obtained from a server system in response to identifying the second electronic device or the credential associated with the second electronic device, to obtain the most current security policy. The first electronic device determines that the one or more conditions specified in the security policy corresponding to the user credential are satisfied. The first electronic device provides the password in response to determining that the one or more conditions specified in the security policy corresponding to the user credential are satisfied. If the first electronic device determines that one or more conditions of the credential are not satisfied, the first electronic device can deny access so that the user must log in manually. As another example, if the first electronic device determines that one or more conditions of the credential are not satisfied, the first electronic device can require the user to enter additional authentication information, such as a biometric identifier or password, to the first electronic device or the second electronic device to further verify the user's identity before granting access.

The user credential linked to the association between the first electronic device and the second electronic device can be a credential separate from a password for the first electronic device, a password for the second electronic device, and any passcode used during pairing of the devices. For example, the user credential can be a credential issued to the user by a credential management server system. The user credential may specify an identity of a user and/or the user's role in an organization. For example, the user credential may be an employee badge.

The user credential linked to the association between the first electronic device and the second electronic device can have one or more logging or reporting policies designated. The first electronic device can identify these policies just as it can determine a security policy. The reporting policy may specify that the first electronic device determine and provide information indicating all devices detected nearby to a server system. As additional examples, the reporting or logging policy may instruct the first electronic device to collect, store, and/or send geolocation data (e.g., a location of the first electronic device), beacon data (e.g., data from beacon messages received), application context data (e.g., identity of or information about applications installed on or running on the first electronic device), movement data (e.g., data indicating location, orientation, and motion patterns of the first electronic device or second electronic device), or authentication history data (e.g., data indicating how, when, and where access attempts were made by the current user and/or other users, and whether authentication was successful). The first electronic device can perform the logging and reporting actions specified in the reporting policy for the credential as part of the process 600.

The techniques discussed for obtaining access to a device based on physical proximity can also be used to gain access to logical resources. For example, when a user approaches his desk and his computer unlocks due to the presence of his phone, the computer may also provide access to a VPN. Just as the access control agent on the computer provided a password to the operating system to unlock the computer, the access control agent may enter a password for a VPN based on proximity of the user's phone. For example, the phone may store and provide the VPN password in the same manner done for the computer password. Alternatively, the access control agent or operating system may store the VPN password. The VPN access request may be made using Security Assertion Markup Language (SAML) format, and may occur in the context of a SSO service.

When accessing a VPN or logical resource, a computer or other device may again verify that policies and conditions on use of a credential are satisfied. The VPN access may be linked to the same credential used for access to the computer or a different credential. Additionally, credentials may define different policies or conditions corresponding to different access actions (e.g., accessing a computer vs. a VPN). For example, logical access may, in some instances, be considered a higher security risk than accessing a computer, and thus a credential may impose stricter restrictions for the logical access. Thus, the same steps verifying at least a minimum signal strength of the nearby phone, verifying the validity of the credential and that credential policies are satisfied can be performed again for a logical access action. Of course, multiple actions may be tied together for a single association if desired, e.g., so that a single determination can grant access to a variety resources, both logical and physical.

Figure 7:
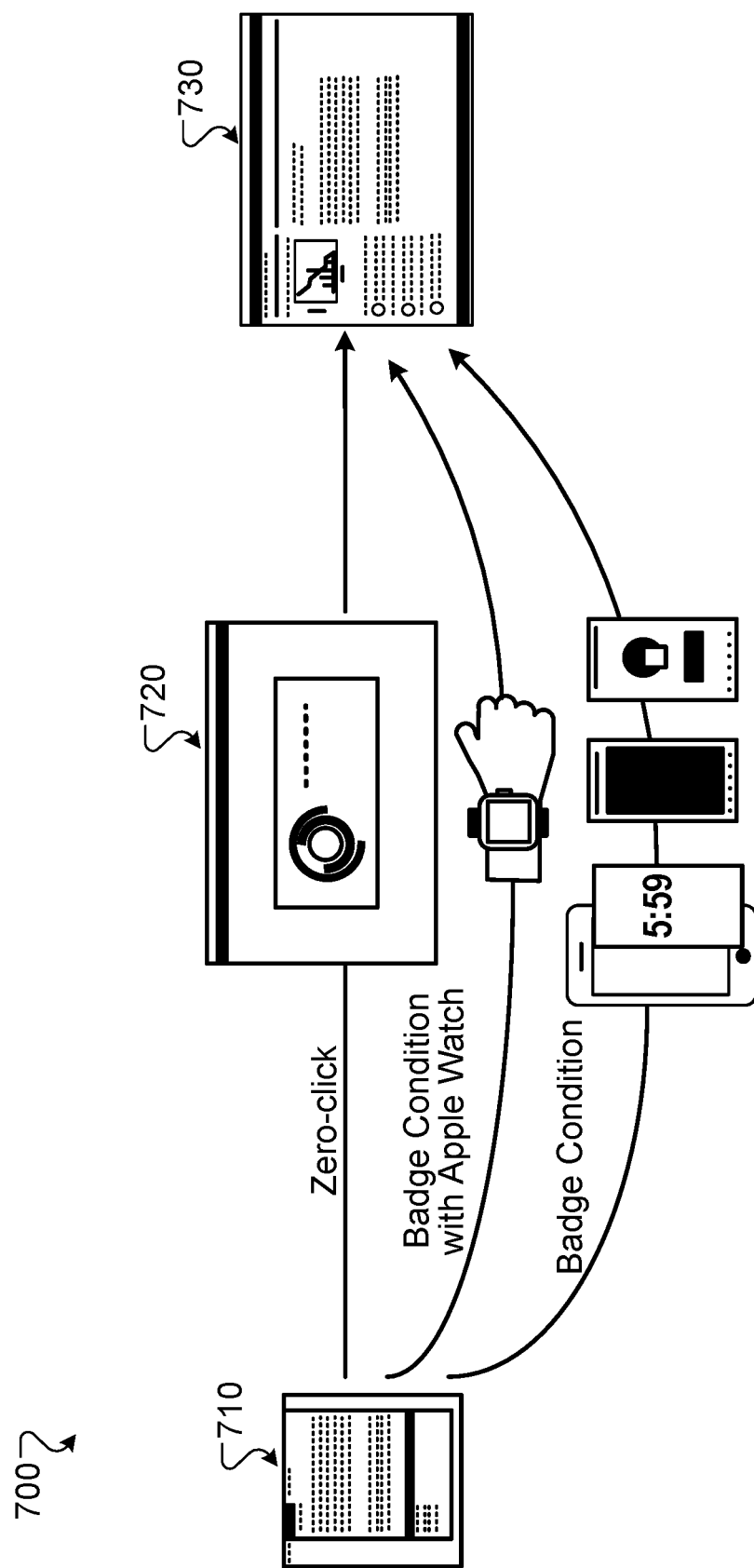
FIG. 7 is a diagram illustrating interfaces and devices for proximity-based access.

FIG. 7 is a diagram 700 showing an example of interactions that can provide logical access based on physical proximity of a device. The figure shows a progression of user interfaces 710, 720, 730 shown as a user obtains access to a logical resource, in this instance, a web page that requires authentication.

The user interface 710 represents a user selecting a bookmark for a web page that requires user authentication for access. Alternatively, the user may interact with a hyperlink, a shortcut, an application icon, or perform another action to indicate intent to access a logical resource. In the present example, the selection the bookmark causes a web browser to open a window that navigates to the URL of the bookmarked web page.

In some implementations, the user has previously configured the web browser to communicate with the access control agent running on the computer. Similarly, the web page may be one that permits use of a single-sign-on (SSO) system supported by the access control agent.

The user interface 720 shows the web page loading in the browser window, while the computer communicates with one or more user devices in proximity with the computer. When the browser determines that authentication is needed, the web browser notifies the access control agent and requests an authenticated session. As discussed further below, the access control agent then communicates with a server to obtain information for a new authenticated session, and then initiates a proximity check to see if any paired devices are present. For example, the access control agent may access data from received Bluetooth advertisements to determine whether a paired device is present, and/or may send Bluetooth messages to initiate communication.

When the phone or other paired device is nearby, the access control agent may cause the computer to initiate communication of the wireless link. Although the phone may be locked, the communication may wake up the phone and request that the phone approve the new session. The access control agent provides the information for a new session to the phone, which then verifies that policies for the appropriate credential are satisfied.

Depending on various factors, such as the policies of the credential linked to the pairing of the computer and phone, the presence of the paired phone may be sufficient for the access control agent to complete the SSO authentication and provide access to the web page. The access control agent on the computer may communicate with the access application on the phone, in some instances without alerting the user, to verify the identity of the phone. In some implementations, the access control agent receives a password or data indicating that the phone is authorized to perform actions using the credential. In other implementations, the user may be required to provide perform an action, such as unlock the phone or enter data into the access application.

If the phone determines that all required conditions are met for approval of the session, the phone approves the authentication. In some implementations, the approval is transmitted from the phone to a server, and the server sends the completed authentication session information to the access control agent of the computer, which passes it to the browser. As a result the web page uses the authenticated SSO session to provide the user access to the web page, as shown in the interface 730.

Figure 8:
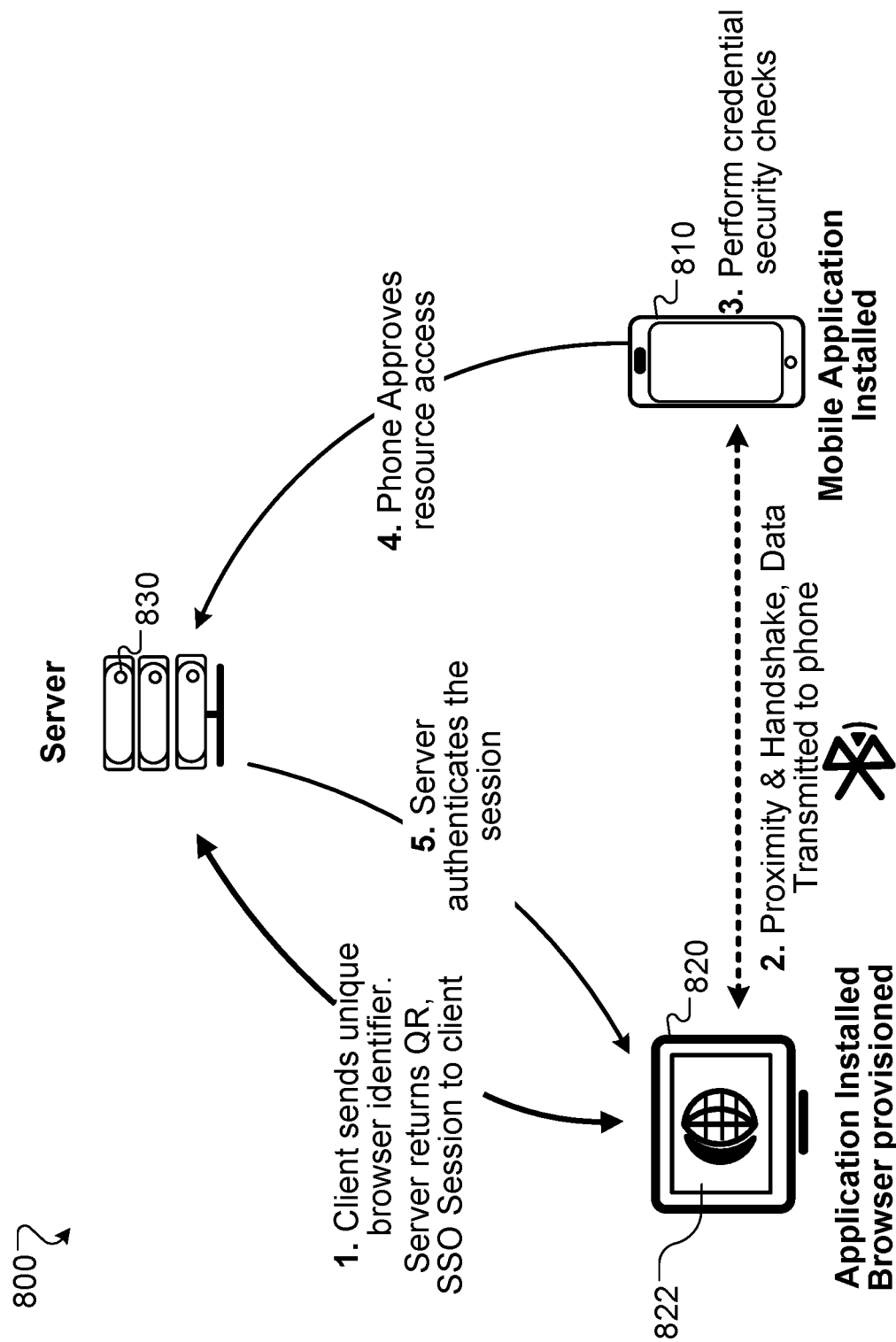
FIG. 8 is a diagram illustrating a system for providing proximity-based access.

FIG. 8 is a diagram that illustrates an example of a system 800 for providing logical access based on proximity of a device. The system includes a mobile device 810, a computer 820, and a server 830. These elements can have the features discussed above for the mobile device 110, resource or computer 120, and server 130. The computer 820 runs an access control agent that manages access decisions. Additionally the computer 820 runs a browser 822 that has been linked, by the access control agent, to the mobile device 810 to designate the mobile device 810 as an authentication factor for a SSO service.

Initially, a user performs an action that requires authentication, such as attempting to access a secured web site, web application, or VPN. In response the access control agent or other client application on the computer 820 detects the need for authentication and initiates the process shown in FIG. 8. The steps discussed in FIG. 8 describe techniques to obtain access to a web page, but other logical resources may be accessed in a similar manner. In this example, a user has navigated to a web page that requires authentication, and the web browser on the computer 820 notifies the access control application on the computer 820. For example, the browser may make a request for an authenticated SSO session to the access control application.

In step (1), the access control agent sends a unique browser identifier. This can be a value, similar to a cookie, that is stored to identify the previous authentication or setup linking the browser to the device 810. In response to sending the browser identifier, the access control agent of the computer 820 receives data for an SSO session from the server 830. In some implementations, the server 830 sends the data for the SSO session as data for a QR code. Rather than displaying the QR code and requiring the mobile device 810 to capture an image of the QR code to proceed, the system can proceed to detect proximity of an appropriate device.

In step (2), the access control agent of the computer 820 causes the computer to check for the proximity of a paired device that can be used to authenticate the new SSO session. When the mobile device 810 is nearby, e.g., within communication range over Bluetooth, the computer 820 wakes up the phone and initiates a handshake process. The access control agent may request that the mobile device 810 authorize the SSO session. In some implementations, after providing this request and the related SSO session information, the remaining verifications to authorize the SSO session are handled by the mobile device 810 and the server 830.

The access control agent uses this connection to pass the received SSO session information to the mobile device 810. In some implementations, the access control agent provides data indicating the credential that is associated with the current access being attempted. In other implementations, the mobile device 810 can determine the appropriate credential from data stored at the mobile device 810, since the credential may be the one previously used to link the browser and the mobile device 820.

In step (3), the communications from the computer 820 cause the access application on the mobile device 810 to perform a variety of checks. The mobile device 810 can determine its context, e.g., its location, and what other users or devices are nearby. It can also determine policies for the credential previously used to configure the browser for streamlined authentication. The mobile device 810 then determines whether authentication is appropriate according to those policies. For example, some credentials may require use in a particular location or within a particular range of time. Others may require a user action, such as entering a PIN or indicating confirmation of the action requested by the computer 820. Of course, if the credential policies are satisfied without user action, then the mobile device 810 can proceed with the authentication process without notifying the user.

In step (4), having determined that the appropriate conditions are satisfied, the access application of the mobile device 810 send a message approving authentication of the SSO session to the server 830. By providing the approval to the server 830, rather than the computer 820 directly, the mobile device can make an out-of-band request to complete the authentication which provides additional security.

In step (5), the server 830 receives the approval message from the mobile device 810 and sends data authenticating the SSO session back to the computer 820. The access control agent of the computer 820 provides the session information to the browser, which uses the authenticated session to display the web page the user requested.

Figure 9:
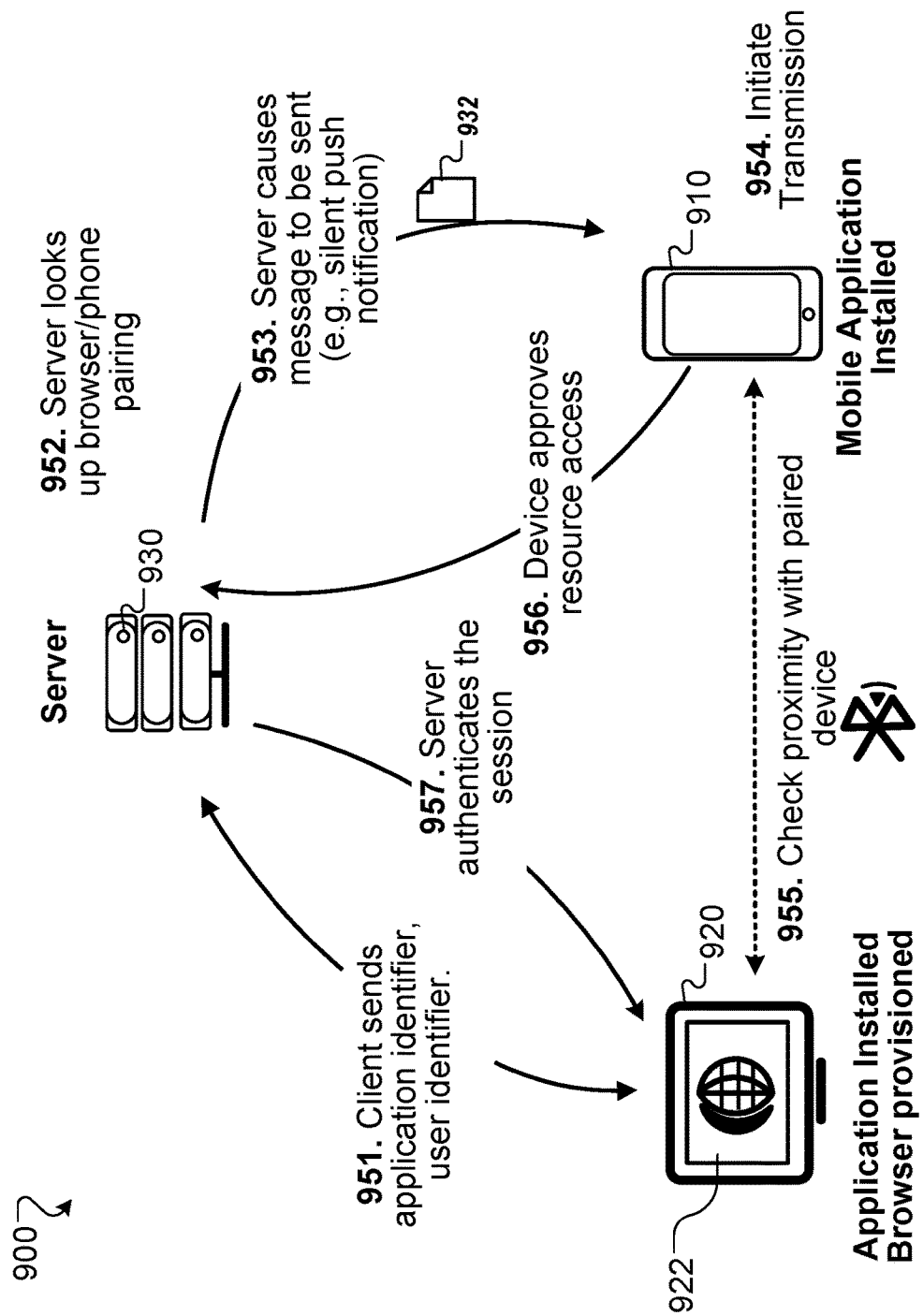
FIG. 9 is a diagram illustrating a system for providing proximity-based access.

FIG. 9 is a diagram that illustrates an example of a system 900 for providing logical access based on proximity of a device. The system includes a mobile device 910, a computer 920, and a server 930. These elements can have the features discussed above for the mobile device 110, resource 120, and server 130. The computer 920 runs an access control agent that manages access decisions. Additionally the computer 920 runs a browser 922 that has been associated, by the access control agent, to the mobile device 910 to designate the mobile device 910 as an authentication factor for a SSO service.

For example, the mobile device 910 can be previously paired with the computer 920 over a Bluetooth wireless communication link. In some implementations, pairing is linked to a specific user credential of the user of the mobile device 910, and authentication and management for the user credential are handled by the server 930. The pairing may cause data to be stored, and cause encryption keys corresponding to the pairing to be generated and transmitted to the devices 910, 920, in the manner discussed above. Additionally, the pairing may correspond specifically with the instance of the browser running on the computer 920, so that the pairing enables the device 910 to serve as proof of identity for the browser, but not for other authentications that are not linked to the pairing.

Initially, a user performs an action that requires authentication, such as attempting to access a secured web site, web application, or VPN. In response the access control agent or other client application on the computer 920 detects the need for authentication and initiates the process shown in FIG. 9. The steps discussed in FIG. 9 describe techniques to obtain access to a web page, but other logical resources may be accessed in a similar manner.

In the example of FIG. 9, a user navigates to a web page or other Internet resource that requires authentication. For example, to initiate navigation to the resource, the user may select a hyperlink or icon on a desktop or application, type a URL into a browser, select a search result, select a bookmark, or otherwise initiate navigation to the resource. The web browser receives the URL for the resource on the computer 920 notifies the access control agent on the computer 920.

In some implementations, navigation to the resource causes the browser to make a request for an authenticated SSO session to the access control agent of the computer 920. In some implementations, the browser may begin loading the page and be redirected to a SSO page, e.g., a page managed by an identity provider, such as the server 930. In some implementations, the access control agent can be integrated with the browser to detect navigation to resources for which the access control agent is configured to provide access.

In step (951), the access control agent or browser sends a unique application identifier to the server 930, for example, with a request to authenticate a session for the resource. The application identifier can be a value, similar to a cookie, that is stored to identify the previous authentication or setup linking the browser to the device 910. For example, the application identifier can be a browser identifier corresponding to the pairing of the mobile device 910 with the computer 920 to enable the mobile device 910 to act as an authentication factor for the browser.

In some implementations, in response to sending the browser identifier, the access control agent of the computer 920 receives data for an SSO session from the server 930. In some implementations, the server 930 sends the data for the SSO session as data for a QR code. Rather than displaying the QR code and requiring the mobile device 910 to capture an image of the QR code to proceed, the system can proceed to detect proximity of an appropriate device.

In some implementations, the access control agent or the browser sends a session identifier for a session being initiated to the server 930. The server 930 may then authenticate this session as discussed with respect to FIG. 9.

In some implementations, the access control agent also sends a user identifier for a user whose user credential was linked to the pairing between the mobile device 910 and the computer 920, when the browser was configured to permit proximity-based access.

While the browser identifier and user identifier can be provided by the access control agent, the two identifiers may additionally or alternatively be retrieved from local storage at the computer 920 and provided to the server 930 by the browser. For example, the resource the web browser navigates to may redirect the browser to a SSO page, which may instruct the web browser to provide the browser identifier and user identifier to the server 930.

In some implementations, the computer 920 provides the browser identifier and the user identifier to the server 930 over a network without first verifying proximity of the mobile device 910. From the records that indicate the previous pairing of a device to enable authentication with the browser, and the associated user credential for the user, the computer 920 can determine the user identifier for the user and the application identifier or cookie corresponding to the association. If only one device has been associated with the browser, the identifiers stored for that association are sent to the server 930.

In some implementations, the computer 920 attempts to communicate with a nearby device of the user before sending the information to the server 930. For example, the computer 920 may determine a previously paired device that has been designated as an authentication factor is in communication range, or within a predetermined level of proximity. If the computer 920 does detect the device 910, e.g., by receiving a wireless message from the phone, which may be in response to a message sent by the computer 920, the computer 920 determines that a prior pairing has occurred, and looks up the application identifier and user identifier corresponding to the pairing with the device 910. If multiple different devices have been associated with the browser, this can allow the computer 920 to identify the appropriate user, device, and user credential for the user and device 910 nearby, which are be used in authenticating the session with the resource.

In step (952) the server 930 retrieves records of the pairing of the device 910 with the browser of the computer 920. When the device 910 is associated with a browser or other application, records indicating the association can be stored at the computer 920 as well as the server 930. The server 930 can then access the records for the association based on the browser identifier and/or user identifier received after the user initiates navigation to the resource.

In step (953) the server 930 causes a message 932, such as a silent push notification, to be sent to the device 910. The message 932 can include a request for the device 910 to authenticate the session or verify that one or more conditions for authenticating the session are met. For example, the message 932 can instruct the device 910 to determine which devices are nearby. In some instances, the message 932 can instruct the device 910 to determine whether a specific device, e.g., the computer 920, is within a threshold level of proximity. In some instances, the message 932 can instruct the device 910 to initiate communication, e.g., to send and listen for wireless messages with a certain communication protocol, with or without specifying which devices or levels of proximity should be verified. The message 932 can indicate other conditions that are required to be satisfied for use of the user credential and thus authentication of the session. The message 932 can be sent using a push notification service that may be operated separately from the server 930.

In step (954), the device 910 receives the message 932 from the server 930 and changes a transmission mode to improve detection of the device 910 by nearby devices. For example, the device 910 can increase the frequency of transmitting advertisement messages over the short-range wireless communication channel.

When the message 932 is received by the device 910, the operating system of the device 910 determines that the message 932 relates to the access application on the device 910. The operating system passes the information in the message 932 to the access application. The contents of the message 932 may include an instruction or command for the application to change or initiate a mode of transmitting messages identifying the device 910. Alternatively, the application can be configured to initiate change or initiate a device discovery mode each time a notification is received, regardless of the message contents. If the access application is not currently running on the device 910 when the message 932 is received, the operating system may open the application to enable handling of the message 932.

In many cases, the access application can be already running in the background on the device 910 at the time the message is received 932, which further reduces processing delay to complete authentication. As a result of the message 932, the operating system can grant the access application temporary elevated status, for example, with the ability to use device resources more fully to respond to the message 932. For example, the operating system may, for a short time such as 10 seconds, remove the limitations typically placed on applications running in the background, and may allow the access application to increase the use of a radio for the wireless communication channel. The access application, with the elevated status, initiates or modifies the mode of making transmissions using the radio, e.g., by switching from a low-frequency or low-power scanning mode, or a mode in which transmissions did not occur, to a mode in which transmissions occur more frequently. The access application may change the operating mode of the radio, alter radio settings, activate a radio that was not being used when the message 932 was received, or otherwise change the behavior of the radio. The access application may use functions provided by the operating system to perform the scanning, so that transmissions are received and processed in the typical manner. The access application may continue the enhanced transmission mode for a predetermined time period, e.g., 10 seconds, 30 seconds, etc., or until the elevated status of the access application expires.

In some implementations, the message 932 causes the device 910 to perform security checks associated with the user credential linked to the association of the device 910 with the browser of the computer 920. In some implementations, the message 932 causes the device 910 to perform these actions, as with the actions for initiating and carrying out enhanced device discovery, without notifying the user, e.g., while keeping a screen of the device 910 dark. The security checks can include determining whether one or more conditions that limit use of the credential are satisfied. This may include restrictions on the location of the device 910, the time the credential is used, and others. The device 910 may receive an indication of the conditions for the credential from the message from the server 930, or may already store data indicating the conditions, or may send a request for information indicating the conditions. The device 910 determines whether each of the conditions limiting use of the credential are satisfied.

In step (955) the device 910 verifies proximity of the device 910 with the computer 920. The message from the server 930 may cause the device to temporarily wake up from a low power state and to begin scanning for nearby devices, e.g., sending messages and listening for responses, for a particular time period, such as 5 seconds or 10 seconds. The device 910, such as a phone, can remain silent and with the screen off during that time.

When the mobile device 910 is nearby, e.g., within communication range over Bluetooth, the device 910 communicates with the computer 920 and performs a handshake process. The access control agent of the computer 920 can provide information that uniquely identifies the session authentication attempt, such as an identifier for the current SSO session being authenticated. This may be provided in an encrypted form, using the encryption keys generated for the association between the device 910 and the browser of the computer 920. The device 910 can also gauge the signal strength of the wireless communications with the computer 920 to determine whether the devices 910, 920 are within a predetermined threshold level of proximity required for proximity-based access to be granted.

As part of determining whether the appropriate conditions are satisfied, the mobile device 910 can determine its context, e.g., its location, and what other users or devices are nearby. It can also determine policies for the credential previously used to configure the browser for streamlined authentication. The mobile device 910 then determines whether authentication is appropriate according to those policies. For example, some credentials may require use in a particular location or within a particular range of time. Others may require a user action, such as entering a PIN or indicating confirmation of the action requested by the computer 920. Of course, if the credential policies are satisfied without user action, then the mobile device 910 can proceed with the authentication process without notifying the user.

In step (956), after determining that the conditions on use of the credential are satisfied, and after receiving the SSO session identifier from the computer 930 over the wireless connection, the device 910 responds to the server 930 and approves authentication of the SSO session. By providing the approval to the server 930, rather than the computer 920 directly, the mobile device can make an out-of-band request to complete the authentication which provides additional security. The message to the server 930 can indicate a result of a determination that the conditions are satisfied. The message may additionally or alternatively include information indicating the context and data detected by the device 910 that allow the server 930 to determine whether the conditions are satisfied. These conditions can be, e.g., conditions that restrict times or geographic locations when a credential can be used, or that limit times or locations when proximity-based authentication can be performed.

The message from the device 910 to the server 930 can provide the SSO session identifier that the device 910 received from the computer 930. In some implementations, the server does not provide the SSO session identifier to the device 910. By providing the SSO session identifier, the device 910 demonstrates that it is in proximity to and has communicated with the computer 920 to obtain the SSO session identifier.

In some implementations, the roles of the computer 920 and the device 910 may be reversed during steps (954) to (956). For example, the computer 920, rather than the device 910, verifies proximity and receives a code. For example, the message 932 can include a value generated by the server 930, and the transmissions from the device 910 in step (954) can provide this value over the local wireless connection between the devices 910, 910. The computer 920 can verify that signal strength of transmissions from the device 910 satisfy a threshold in step (955). Then, in step (956) the computer 920 can send a message to the server 930 that includes the value received over the local wireless connection and approves the resource access.

In step (957), the server 930 receives the approval message from the mobile device 910 and completes authentication of the session. Sending of the approval message by the device 910 can indicate that the device 910 has verified that it is in an appropriate level of proximity with the computer 920 to permit proximity-based authentication of the session. The server 930 can then authenticate the session, and in some instances redirect the browser to the originally requested resource, in response.

In some implementations, the server 930 sends data indicating that the SSO session has been authenticated back to the computer 920. In other implementations, the browser periodically polls the server 930, e.g., sending a request each second or at another interval, until the SSO session is authenticated and navigation can continue to the requested resource. For example, the SSO resource may redirect the browser back to the initially requested resource once the session is authenticated.

Once the SSO session is authenticated, the browser loads and displays a rendering of the resource the user requested. The process shown in FIG. 9 can thus allow an Internet resource, e.g., a web application or web page, to be authenticated based on proximity of the device 920 to the computer 920, without the user entering any input to the device 910. If the device 910 is a phone, for example, the user can leave the phone in the user's pocket or purse and the presence of the device alone is considered sufficient to indicate the presence of the authorized user, if other conditions on the credential are also satisfied.

If the device 910 determines that one or more conditions on the credential are not satisfied, or that the computer 920 is not within the required level of proximity, then the device 910 may indicate to the server 930 that the authentication is not approved. Similarly, if the server 930 determines that the SSO session identifier provided by the device 910 does not match the SSO session identifier provided by the computer 920, authentication is also denied.

In some implementations, the credential may have an associated logging or reporting policy. The device 910 and/or the computer 920 can provide data to the server 930 as indicated in the logging or reporting policy of the credential.

A number of variations may be made. For example, the device 910 may not receive a session identifier from the computer 920 or provide the session identifier to the server 930. Instead, the device 910 may simply indicate that the computer 920 is within the required level of proximity, or may simply approve authentication of the session. The device 910 may verify the identity of the computer 920 based on, for example, the use of the encryption keys provided during pairing, or other factors.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A method comprising:
   receiving, by an electronic device, a message sent by a server system, the message being received over a network using a first communication channel; and
   in response to receiving the message:
      determining, by the electronic device, that the received message corresponds to a particular secured resource, wherein the particular secured resource is (i) a device different from the electronic device or (ii) a logical resource accessed from a device different from the electronic device;
      changing, by the electronic device, one or more parameters used by the electronic device to communicate using a second communication channel that is different from the first communication channel; and
      providing, by the electronic device, authentication data for accessing the particular secured resource, the authentication data being stored at the electronic device prior to receiving the message.

2. The method of claim 1, wherein changing the one or more parameters comprises changing one or more parameters for transmission of messages by the electronic device over the second communication channel, wherein the messages identify the electronic device.

3. The method of claim 1, wherein the one or more parameters are changed and the authentication data is provided before receiving user input to the electronic device following receipt of the message by the electronic device using the first communication channel.

4. The method of claim 1, wherein receiving the message comprises receiving a notification over a cellular network.

5. The method of claim 1, wherein receiving the message comprises receiving the message over the Internet.

6. The method of claim 1, wherein the particular secured resource is a physical device, and wherein the message includes an identifier for the physical device;
   wherein the authentication data stored at the electronic device prior to receiving the message comprises a password for the physical device; and
   wherein determining that the message corresponds to a particular secured resource comprises determining that an identifier in the message matches an identifier corresponding to the physical device.

7. The method of claim 6, wherein providing the authentication data comprises providing the authentication data to the server system over the Internet, without providing the authentication data directly to the physical device.

8. The method of claim 1, wherein second communication channel comprises a direct short-range radio-frequency communication channel, and wherein providing the authentication data comprises providing the authentication data over a communication channel that is different from the second communication channel.

9. The method of claim 1, wherein the second communication channel comprises a direct short-range radio-frequency communication channel, and providing the authentication data comprises the authentication data to the server system over the first communication channel.

10. The method of claim 1, wherein, before changing the one or more parameters, the electronic device is configured to transmit messages identifying the electronic device at a first frequency over the second communication channel; and
wherein changing the one or more parameters comprises changing the one or more parameters to cause the electronic device to transmit messages identifying the electronic device at a second frequency over the second communication channel, wherein the second frequency is greater than the first frequency.

11. The method of claim 10, wherein the messages identifying the electronic device are Bluetooth advertisement messages.

12. The method of claim 1, wherein receiving the message comprises receiving the message from the server system over the Internet; and
wherein providing the authentication data comprises providing the authentication data to the server system over the Internet.

13. The method of claim 1, wherein the particular secured resource is a computing device that is different from the electronic device; and
wherein the authentication data comprises authentication data configured to permit access to the computing device.

14. The method of claim 1, wherein the particular secured resource is a logical resource;
wherein the message is sent by the server system in response to an attempt to access the logical resource using a computing device that is different from the electronic device; and
wherein the authentication data comprises authentication data for the logical resource.

15. The method of claim 14, wherein the logical resource is a web page, a web application, or a virtual private network.

16. The method of claim 1, wherein the particular secured resource is a computer and the electronic device is a mobile phone.

17. The method of claim 1, wherein the message is provided to facilitate access to the secured resource by a computing device that is different from the electronic device;
wherein providing the authentication data comprises providing the authentication data to the server system in an encrypted form in which the authentication data has been encrypted using a key corresponding to the computing device.

18. An electronic device comprising:
one or more processors; and
one or more machine-readable media storing instructions that, when executed by the one or more processors, cause the electronic device to perform operations comprising:
receiving, by the electronic device, a message sent by a server system, the message being received over a network using a first communication channel; and
in response to receiving the message:
determining, by the electronic device, that the received message corresponds to a particular secured resource, wherein the particular secured resource is (i) a device different from the electronic device or (ii) a logical resource accessed from a device different from the electronic device;
changing, by the electronic device, one or more parameters used by the electronic device to communicate using a second communication channel that is different from the first communication channel; and
providing, by the electronic device, authentication data for accessing the particular secured resource, the authentication data being stored at the electronic device prior to receiving the message.

19. The system of claim 18, wherein the one or more parameters are changed and the authentication data is provided before receiving user input to the electronic device following receipt of the message by the electronic device using the first communication channel; and
wherein changing the one or more parameters for transmission of messages by the electronic device over the second communication channel comprises increasing a frequency that the electronic device transmits messages identifying the electronic device over the second communication channel.

20. One or more non-transitory machine-readable media storing instructions that, when executed by one or more processors of an electronic device, cause the electronic device to perform operations comprising:
receiving, by the electronic device, a message sent by a server system, the message being received over a network using a first communication channel; and
in response to receiving the message:
determining, by the electronic device, that the received message corresponds to a particular secured resource, wherein the particular secured resource is (i) a device different from the electronic device or (ii) a logical resource accessed from a device different from the electronic device;
changing, by the electronic device, one or more parameters used by the electronic device to communicate using a second communication channel that is different from the first communication channel; and
providing, by the electronic device, authentication data for accessing the particular secured resource, the authentication data being stored at the electronic device prior to receiving the message.

* * * * *